(12) United States Patent
McCloskey et al.

(10) Patent No.: US 10,679,367 B2
(45) Date of Patent: Jun. 9, 2020

(54) METHODS, SYSTEMS, AND APPARATUSES FOR COMPUTING DIMENSIONS OF AN OBJECT USING ANGULAR ESTIMATES

(71) Applicant: Hand Held Products, Inc., Fort Mill, SC (US)

(72) Inventors: Scott McCloskey, Minneapolis, MN (US); Ryan Andrew Lloyd, Plymouth, MN (US)

(73) Assignee: Hand Held Products, Inc., Fort Mill, SC (US)

( * ) Notice: Subject to any disclaimer, the term of this patent is extended or adjusted under 35 U.S.C. 154(b) by 113 days.

(21) Appl. No.: 16/102,048

(22) Filed: Aug. 13, 2018

(65) Prior Publication Data

US 2020/0051262 A1 Feb. 13, 2020

(51) Int. Cl.
*G06T 7/521* (2017.01)
*G06T 7/62* (2017.01)
(Continued)

(52) U.S. Cl.
CPC .......... *G06T 7/521* (2017.01); *G06K 9/00201* (2013.01); *G06K 9/00771* (2013.01);
(Continued)

(58) Field of Classification Search
CPC ......... G06T 7/521; G06T 7/62; G06T 7/0004; G06T 7/20; G06K 9/00201; G06K 9/00771
See application file for complete search history.

(56) References Cited

U.S. PATENT DOCUMENTS

| 4,498,778 A | * | 2/1985 | White | G01B 11/25 348/94 |
| 5,530,549 A | * | 6/1996 | Brown | G01B 11/00 356/622 |

(Continued)

OTHER PUBLICATIONS

Chida, Akisato, et al., "Reconstruction of polygonal prisms from point-clouds of engineering facilities", Journal of Computation Design and Engineering, Oct. 2016, vol. 3, Issue 4, pp. 322-329, retrieved from <https://ac.els-cdn.com/S2288430016300057/1-s2.0-S2288430016300057-main.pdf?_tid=7481a3cc-28d1-4a31-b28d-89c886fd4ed1&acdnat=1532473619_64a7b3effd0ebeb0500f88df317e4676> on Jul. 24, 2018.
(Continued)

*Primary Examiner* — Manav Seth
(74) *Attorney, Agent, or Firm* — Alston & Bird LLP

(57) ABSTRACT

Various embodiments described herein relate to techniques for computing dimensions of a non-cuboid shaped object using angular estimates associated with 3D points captured in an image of a scene including the object. In this regard, a dimensioning system may capture at least one image of the scene including the object and identify one or more planes on the object from the captured at least one image. Further, a surface plane from amongst the one or more identified planes that contains a maximum number of three-dimensional (3D) surface points on the object is determined. Upon determination of the surface plane, angular estimation is determined representing angular values between a normal to the surface plane and a normal to a reference plane. Accordingly, the angular estimation is further used along with an estimated height of the object for computing the dimensions of the object.

20 Claims, 10 Drawing Sheets

(51) Int. Cl.
*G06K 9/00* (2006.01)
*G06T 7/00* (2017.01)
*G06T 7/20* (2017.01)

(52) U.S. Cl.
CPC .............. *G06T 7/0004* (2013.01); *G06T 7/20* (2013.01); *G06T 7/62* (2017.01)

(56) References Cited

U.S. PATENT DOCUMENTS

| | | | | |
|---|---|---|---|---|
| 6,311,098 | B1 * | 10/2001 | Higasayama | G05B 19/4099 700/159 |
| 6,330,523 | B1 * | 12/2001 | Kacyra | G01B 11/002 250/336.1 |
| 6,867,772 | B2 * | 3/2005 | Kotcheff | G06T 17/20 345/420 |
| 7,061,628 | B2 * | 6/2006 | Franke | G01B 11/25 356/604 |
| 7,724,379 | B2 * | 5/2010 | Kawasaki | G01B 11/2509 356/603 |
| 8,334,985 | B2 * | 12/2012 | Sho | G01B 11/2509 356/601 |
| 8,786,595 | B2 * | 7/2014 | Baker | G06T 17/20 345/419 |
| 9,053,547 | B2 | 6/2015 | Kitamura et al. | |
| 9,242,171 | B2 | 1/2016 | Newcombe et al. | |
| 9,464,885 | B2 * | 10/2016 | Lloyd | G01B 11/02 |
| 9,483,707 | B2 | 11/2016 | Chen | |
| 9,621,793 | B2 * | 4/2017 | Furihata | G01J 9/00 |
| 9,628,775 | B2 * | 4/2017 | Bridges | G01B 21/047 |
| 9,652,852 | B2 * | 5/2017 | Becker | G06T 7/48 |
| 9,823,782 | B2 * | 11/2017 | Gu | G06F 3/0425 |
| 9,879,976 | B2 * | 1/2018 | Bridges | H04N 5/2251 |
| 9,921,048 | B2 * | 3/2018 | Murata | G01C 15/00 |
| 9,984,474 | B2 * | 5/2018 | Bendall | G06T 7/50 |
| 10,019,812 | B2 * | 7/2018 | Bendall | G06T 19/00 |
| 10,060,722 | B2 * | 8/2018 | Bridges | H04N 13/239 |
| 10,089,750 | B2 * | 10/2018 | Ho | G06T 7/73 |
| 10,127,709 | B2 * | 11/2018 | Yamamoto | G06T 1/00 |
| 10,175,360 | B2 * | 1/2019 | Zweigle | H04W 4/70 |
| 10,281,259 | B2 * | 5/2019 | Bridges | H04N 5/2251 |
| 10,378,891 | B2 * | 8/2019 | Franke | G01B 21/08 |
| 10,403,037 | B1 * | 9/2019 | Boardman | G06K 9/6256 |
| 10,444,759 | B2 * | 10/2019 | Douillard | G01S 17/023 |
| 10,458,784 | B2 * | 10/2019 | Ulmer | G01B 11/005 |
| 2006/0133785 | A1 | 6/2006 | Ko et al. | |
| 2007/0065004 | A1 * | 3/2007 | Kochi | G01C 11/06 382/162 |
| 2009/0097039 | A1 * | 4/2009 | Kawasaki | G01B 11/2509 356/603 |
| 2010/0079456 | A1 * | 4/2010 | Barth | G06T 15/08 345/424 |
| 2012/0069012 | A1 * | 3/2012 | Facchin | G01C 11/02 345/419 |
| 2012/0075342 | A1 * | 3/2012 | Choubassi | G06T 11/00 345/633 |
| 2013/0231892 | A1 * | 9/2013 | Franke | G01B 11/0616 702/170 |
| 2015/0003669 | A1 * | 1/2015 | Solgi | G06K 9/3241 382/103 |
| 2017/0054965 | A1 * | 2/2017 | Raab | H04N 5/2254 |

OTHER PUBLICATIONS

Ferreira, Beatriz Quintino, et al., "Volumnect—Measuring Volumes with Kinect™", Proceedings of SPIE, Mar. 6, 2014, 6 pages, retrieved from <http://welcome.isr.tecnico.ulisboa.pt/wp-content/uploads/2015/11/VOLUMNECT-Measuring-Volumes-with-Kinect.pdf> on Jul. 24, 2018.

Lloyd, Ryan, et al., "Recognition of 3D Package Shapes for Single Camera Metrology", Proceedings of IEEE Winter Conference on Applications of Computer Vision, Mar. 24-26, 2014, 8 pages, Steamboat Springs, Colorado.

Tang, Shuai, et al., "Histogram of Oriented Normal Vectors for Object Recognition with a Depth Sensor", Proceedings of 11th Asian Conference on Computer Vision, Nov. 5-9, 2012, pp. 525-538, Daejeon, Korea.

* cited by examiner

METHODS, SYSTEMS, AND APPARATUSES FOR COMPUTING DIMENSIONS OF AN OBJECT USING ANGULAR ESTIMATES

BACKGROUND

Generally, in material handling environments such as, but not limited to, warehouses, inventories, distribution and shipping centers etc., measuring dimensions of a pallet or a package that is intended for shipping is often required. Applicant has identified a number of deficiencies and problems associated with conventional methods of computing dimensions of an object. Through applied effort, ingenuity, and innovation, many of these identified problems have been solved by developing solutions that are included in embodiments of the present disclosure, many examples of which are described in detail herein.

BRIEF SUMMARY

Various embodiments of the present disclosure relate generally to a dimensioning system that uses image processing techniques to measure a physical size of an object and, more particularly, to methods, systems, and apparatuses that compute dimensions of objects using angular estimates related to three-dimensional points in a scene including an object to be dimensioned.

In accordance with an embodiment, a method for computing dimensions of a non-cuboid shaped object is described. The method includes capturing by an image capturing unit of an object dimensioning system, at least one image of a scene. In this aspect, the scene is associated with a field of view of the object dimensioning system and the non-cuboid shaped object is in the scene. The method further includes determining from the at least one image, multiple three-dimensional (3D) points representing 3D coordinates of various points in the scene. The method then includes identifying, from amongst the multiple 3D points, multiple "3D surface points" corresponding to at least one surface of the non-cuboid shaped object that is captured in the at least one image. The method further includes identifying one or more planes, wherein each of the one or more planes is defined by a set of neighboring 3D surface points comprising at least three 3D surface points neighboring to each other from amongst the multiple 3D surface points. Further, the method includes determining, a surface plane from amongst the one or more identified planes, wherein the surface plane is coincident with a top surface of the non-cuboid shaped object facing the field of view of the dimensioning system and contains a maximum of the multiple 3D surface points. Further, the method includes determining an angular estimation for the determined surface plane and corresponding to one interior angle of the non-cuboid shaped object. In this regard, the determination of the angular estimation includes (i) determining a surface normal of the surface plane, (ii) determining a reference surface normal of a reference surface, and (iii) calculating the angular estimation based on an angle between the surface normal and the reference surface normal. The method further includes computing the dimensions of the non-cuboid shaped object based on the angular estimation and an estimated height of the non-cuboid shaped object.

In an embodiment, the determination of the multiple 3D points representing the 3D coordinates may include determining a height estimation for each 3D surface point relative to the reference surface. In this regard, according to an embodiment, the estimated height of the non-cuboid shaped object is determined based on the estimation of height of each 3D surface point relative to the reference surface.

In accordance with an embodiment, determining the surface plane comprises (a) selecting a consensus set of 3D surface points from amongst the multiple 3D surface points, where the consensus set includes at least three 3D surface points, (b) creating a hypothesis model that corresponds to at least one plane defined by the selected consensus set of 3D surface points, (c) computing a distance between the hypothesis model and each 3D surface point other than 3D surface points in the consensus set of 3D surface points, (d) adding a first 3D surface point to the selected set of 3D surface points, wherein the computed distance of the first 3D surface point satisfies a predefined tolerance threshold, (e) repeating the steps (a)-(d) until 3D surface points in the selected set of 3D surface points satisfy a predefined number, and (f) storing the hypothesis model as the surface plane to be considered for estimating the angular estimates, in an instance when 3D surface points in the selected set of 3D surface points satisfies a predefined number.

According to an embodiment, the method further includes calculating a first plurality of angular estimates for the one or more identified planes at a first time point. Here, each of the first plurality of angular estimates is indicative of a first angle between a first local normal of one of the one or more identified planes and a reference surface normal of the reference surface at the first time point. The method further includes calculating a first distribution of the first plurality of angular estimates. The method then includes calculating a second plurality of angular estimates for the one or more identified planes at a second time point. In this aspect, each of second plurality of angular estimates is indicative of a second angle between a second local normal of one of the one or more identified planes and the reference surface normal of the reference surface at the second time point. The method then includes calculating a second distribution of the second plurality of angular estimates. Further, the method includes determining a movement of the object dimensioning system between the first time point and the second time point based on analyzing the first distribution of the first plurality of angular estimates and the second distribution of the second plurality of angular estimates.

According to an embodiment, calculating the first distribution of the first plurality of angular estimates comprises calculating one or more first modes of the first distribution, wherein calculating the second distribution of the second plurality of angular estimates comprises calculating one or more second modes of the second distribution, wherein analyzing the first distribution and the second distribution further comprises determining a shift between the one or more first modes and the one or more second modes.

According to an embodiment, the method further comprises initiating a recalibration of the object dimensioning system subsequent to determining the movement of the object dimensioning system. According to an embodiment, the recalibration comprises providing an alert to a user indicative of the recalibration of the object dimensioning system; and capturing, by the image capturing unit, at least one image of a new reference surface, wherein the object dimensioning system is repositioned with respect to the new reference surface, wherein the new reference surface corresponds to one of a ground plane or a platform for placing objects to be dimensioned by the object dimensioning system.

According to an embodiment, the method further comprises detecting an error in the computed dimensions of the non-cuboid shaped object, wherein the error represents a mismatch of the computed dimensions of the non-cuboid shaped object when compared to predetermined dimensions of the non-cuboid shaped object. According to an embodiment, the non-cuboid shaped object is an isosceles triangle faced prism shaped object, wherein the predetermined dimensions are associated with an equilateral triangle faced prism shaped object.

According to an embodiment, the method further comprises determining a new reference surface for which the object dimensioning system is initially calibrated; and detecting an expected error in the computed dimensions of the non-cuboid shaped object due to the new reference surface.

In accordance with another embodiment, an object dimensioning system is described. The object dimensioning system includes an image capturing unit adapted to capture at least one image of a scene associated with a field of view of the object dimensioning system, wherein a non-cuboid object is in the scene. The object dimensioning unit also includes a processing unit coupled to the image capturing unit. Herein, the processing unit is adapted to: determine, from the at least one image, multiple three-dimensional (3D) points representing 3D coordinates corresponding to multiple points in the scene. The processing unit is further adapted to identify, from amongst the plurality of 3D points, multiple "3D surface points" corresponding to at least one surface of the non-cuboid shaped object that is captured in the at least one image. Further, the processing unit is adapted to identify, one or more planes wherein each of the one or more planes is defined by a set of "neighboring 3D surface points" comprising at least three 3D surface points neighboring to each other from amongst the multiple 3D surface points. The processing unit is further adapted to determine a surface plane from amongst the one or more identified planes. Herein, the surface plane is coincident with a top surface of the non-cuboid shaped object facing the field of view of the object dimensioning system and contains a maximum of the multiple 3D surface points. The processing unit is further adapted to determine an angular estimation for the surface plane and corresponding to one interior angle of the non-cuboid shaped object. In this regard, to determine the angular estimation, the processing unit is adapted to: (a) determine a surface normal of the surface plane, (b) determine a reference surface normal of a reference surface; and (c) calculate the angular estimation based on an angle between the surface normal and the reference surface normal. Further, the processing unit is adapted to compute the dimensions of the non-cuboid shaped object based on the angular estimation and an estimated height of the non-cuboid shaped object.

In an embodiment, to determine the surface plane from amongst the one or more identified planes, the processing unit is further adapted to: (a) select a consensus set of 3D surface points from amongst the multiple 3D surface points, wherein the consensus set includes at least three 3D surface points, (b) create a hypothesis model that corresponds to at least one plane defined by the selected consensus set of 3D surface points, (c) compute a distance to the hypothesis model for each 3D surface point excluding 3D surface points in the consensus set of 3D surface points, (d) add a first 3D surface point to the selected set of 3D surface points, in an instance when the computed distance of the first 3D surface point satisfies a predefined tolerance threshold, (e) repeat the steps (a)-(d), in an instance when 3D surface points in the selected set of 3D surface points are less than a predefined number, and (f) store the hypothesis model as the surface plane to be considered for estimating the angular estimates, in an instance when 3D surface points in the selected set of 3D surface points satisfies a predefined number.

According to an embodiment, the processing unit is further adapted to calculate a first plurality of angular estimates for the one or more identified planes at a first time point. In this regard, each of first plurality of angular estimates is indicative of a first angle between a first local normal of one of the one or more identified planes and the reference surface normal of the reference surface at the first time point. The processing unit is further adapted to calculate a first distribution of the first plurality of angular estimates and calculate a second plurality of angular estimates for the one or more identified planes at a second time point. In this aspect, each of second plurality of angular estimates is indicative of a second angle between a second local normal of one of the one or more identified planes and the reference surface normal of the reference surface at the second time point. Further, the processing unit is adapted to calculate a second distribution of the second plurality of angular estimates. The processing unit is also adapted to determine a movement of the object dimensioning system between the first time point and the second time point based on analyzing the first distribution of the first plurality of angular estimates and the second distribution of the second plurality of angular estimates.

In an embodiment, to determine the plurality of 3D points representing 3D coordinates, the processing unit is also adapted to determine a height estimation for each 3D surface point relative to the reference surface. In this aspect, the estimated height of the non-cuboid shaped object is determined based on the estimation of height of each 3D surface points relative to the reference surface.

In accordance with an embodiment, the image capturing unit of the object dimensioning system further includes a pattern projecting unit adapted to project a light pattern on the non-cuboid shaped object placed in a field of view of the object dimensioning system and an image sensor adapted to capture a reflection of the projected light pattern on the non-cuboid shaped object. In this regard, according to said embodiment, the processing unit is adapted to determine the plurality of 3D points based on the sensing of the reflected light pattern by the image sensor.

In an embodiment, the processing unit is further adapted to initiate, a recalibration of the object dimensioning system based on the detection of the movement of the object dimensioning system. In this regard, to recalibrate the object dimensioning system, the processing unit is adapted to provide an alert to a user indicative of the recalibration of the object dimensioning system. Further, the processing unit is adapted to capture, by the image capturing unit, at least one image of a new reference surface. The new reference surface herein, is such that, the object dimensioning system is repositioned with respect to the new reference surface, and the new reference surface corresponds to one of: a ground plane or a platform for placing objects to be dimensioned by the object dimensioning system.

In accordance with an embodiment, the processing unit is further adapted to detect an error in the computed dimensions of the non-cuboid shaped object. Herein, the error represents a mismatch of the computed dimensions of the non-cuboid shaped object when compared to predetermined dimensions of the non-cuboid shaped object. In this aspect, in one embodiment, the non-cuboid shaped object is an isosceles triangle faced prism shaped object and the predetermined dimensions of the prism corresponds to dimensions computed by the object dimensioning system by assuming the non-cuboid shaped object to be an equilateral triangle faced prism shaped object.

In an embodiment, an apparatus for computing dimensions of an object using a plurality of image frames, the apparatus comprising at least one processor and at least one non-transitory memory including program code, is described. In this regard, the at least one non-transitory memory and the program code are configured to, with the at least one processor, cause the apparatus to at least: (a) capture, at least one image of a scene associated with a field of view, where the non-cuboid shaped object is in the scene, (b) determine, from the at least one image, multiple three-dimensional (3D) points representing 3D coordinates of various points in the scene, (c) identify, from amongst the multiple 3D points, multiple 3D surface points corresponding to at least one surface of the non-cuboid shaped object that is captured in the at least one image, (d) identify one or more planes such that, each of the one or more planes is defined by a set of neighboring 3D surface points comprises at least three 3D surface points neighboring to each other from amongst the plurality of 3D surface points, (e) determine, a surface plane from amongst the one or more identified planes, where the surface plane is coincident with a top surface of the non-cuboid shaped object facing the field of view of the dimensioning system and contains a maximum of the plurality of 3D surface points, (f) determine, an angular estimation for the surface plane and corresponding to one interior angle of the non-cuboid shaped object. In this regard, the determination of the angular estimation includes: (i) determining a surface normal of the surface plane, (ii) determining a reference surface normal of a reference surface; and (iii) calculating the angular estimation based on an angle between the surface normal and the reference surface normal, and (g) compute, the dimensions of the non-cuboid shaped object based on the angular estimates and an estimated height of the non-cuboid shaped object.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained in the following description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
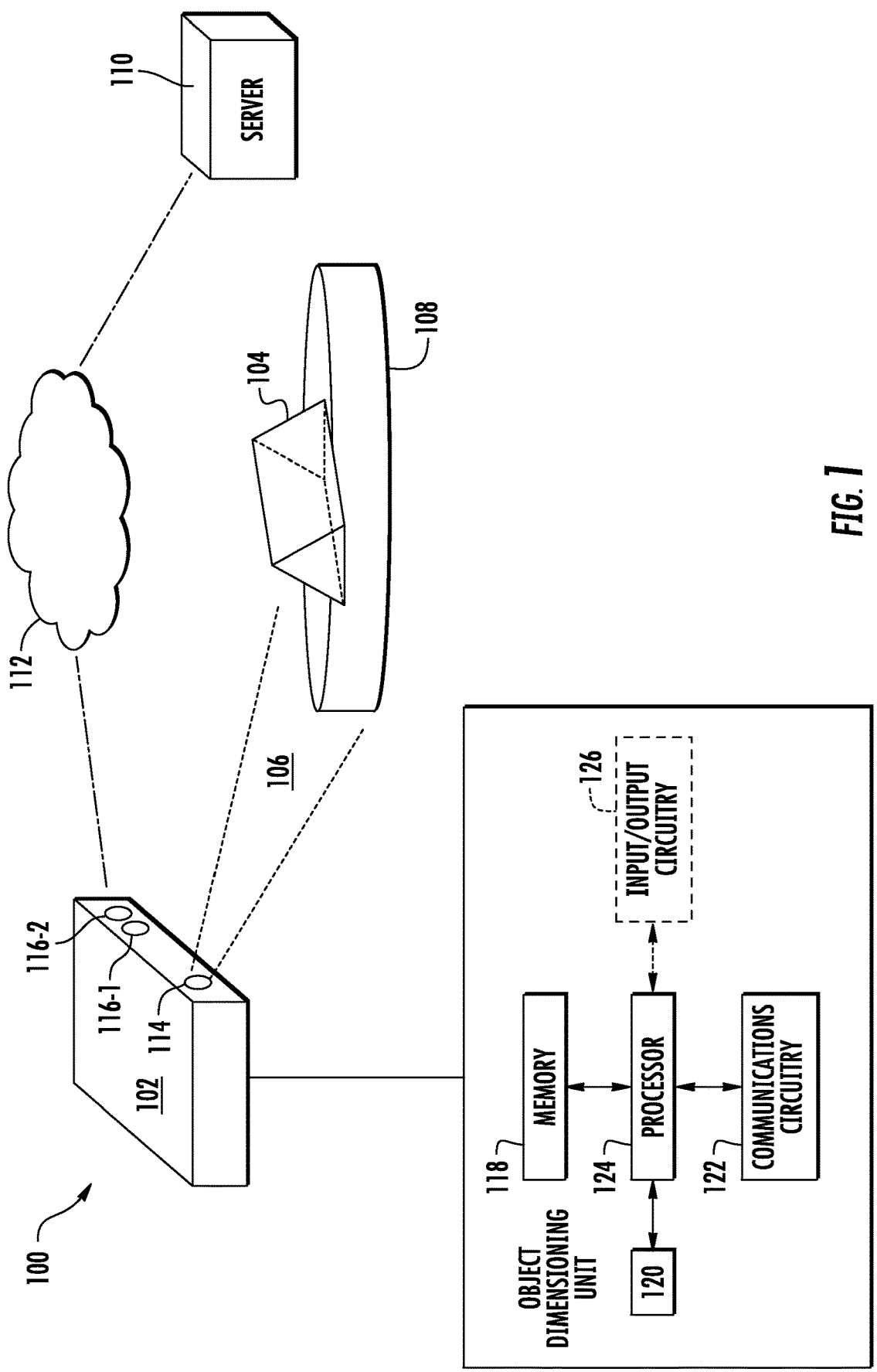
FIG. 1 schematically depicts an exemplary environment including a dimensioning system, in accordance with some embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "image" as used herein may correspond to a representation of an information/data in the form of plurality of pixels in an image plane that may be either a 2-dimensional plane or a 3-dimensional plane. In some examples, the image may represent information/data of a scene where each pixel in the plurality of pixels may, for example, represent a point in the scene. Furthermore, each pixel in the plurality of pixels may include and associated color information and intensity information. Color information may be represented in form of one or more color schemes such as, but not limited to, RGB color scheme, CMYK color scheme, monochrome color scheme, grayscale color scheme, and/or the like. In some example embodiments, the intensity information may be representative of a brightness associated with each pixel. In some example embodiments, the pixel may further include depth information that may correspond to a distance of the point, represented by the pixel, from an image capturing device that captured the image. In an example embodiment, the image may be encoded and represented in one or more formats such as JPEG, Bitmap, PNG, RAW, and/or the like.

The term "object" as used herein may correspond to a physical item, element, device, or the like that present in a scene that is captured by an image capturing device such as a camera. For example, a warehouse or a retail outlet (e.g., a scene) may include objects, parcels, cartons, shipping containers, and/or the like. In some examples, the object may be a static object or a dynamic object. The static object in a scene may correspond to an object which remains substantially stationary over a period of time. For example, static objects in a warehouse may include structural support elements, such as pillars, walls, and/or the like of the warehouse. A dynamic object may correspond to an object with a location in the warehouse that is not fixed. For example, the location of one or more parcels in warehouse may not be fixed, as the one or more parcels may be shipped-in, shipped-out, or otherwise moved in the warehouse (e.g., scene).

The terms "one or more dimensions" as used herein may correspond to any measurement indicative of a size of an object. For example, the one or more dimensions of a cuboidal parcel in a warehouse environment (e.g., scene) may include a measurement of a height of the parcel, a length of the parcel, and/or a width of the parcel. In some example embodiments, the one or more dimensions of an object having an irregular shape may be defined as a measurement of a size of a virtual cuboidal box that encompasses the irregular object (e.g., a length, width, and height of the virtual cuboid).

The term "non-cuboid shaped object" as used herein may refer to an object (for example, but not limited to, a product, an item, a consumer good, an article, a carton box, a packaging box, and/or the like) which is of a non-cuboid shape. Typically, cuboid shaped objects are those objects for which all of its faces of are rectangles. Accordingly, a "non-cuboid shaped object" is an object which has at least one face that is not rectangular. Examples of non-cuboid shapes may include, but not limited to, triangle faced prisms, cones, cylinders etc. In accordance with some embodiments described herein, the non-cuboid shape objects (herein may represent triangle faced prism shaped objects) of which two opposite faces are triangular. In this aspect, in an example, the non-cuboid prism shaped object may be having equilateral triangle shaped faces that are opposite to each other. In another example, the non-cuboid prism shaped object may be having isosceles triangle shaped faces opposite to each other. In this regard, when the non-cuboid shaped object refers to an isosceles triangle faced prism, two interior angles of the object are equal to each other.

In material handling environments, cost to ship a package is historically been computed based on dimensions of the package. Volume dimensioning devices (i.e. dimensioners) are devices that are used for estimating sizes of the packages (such as, items, boxes, cartons, and/or the like). In some scenarios, a dimensioner may be a large device that is a static part of a logistical system in a distribution center or warehouse. A dimensioner is an electronic device configured to obtain optically-sensed characteristics of an object, such as a pallet or a package to be shipped, as well as distance calculations from the dimensioner itself to various parts of the object. Based on this information, the dimensioner calculates volumetric dimensions of the package. In this aspect, when used with a conveyor system, some dimensioners are capable of calculating the volume of dozens of packages per minute. In such material handling environments, where items or packages of different sizes are to be processed at a large scale, dimensioners provide a fast way to calculate the dimensions of the multiple packages. It is often desired to achieve faster processing speed of the dimensioners to increase overall productivity of the material handling environment.

Dimensioning of an object, by the dimensioners, involves identifying a reference plane, for instance, a ground plane, according to which a camera unit of the dimensioners is calibrated, before initiating any dimensioning related operation. However, recalibration of the dimensioners is often required as the dimensioners continue to operate over a period of time. For instance, in some cases, the recalibration of the dimensioners is required when the dimensioner is shifted or re-installed from one location to another. In this regard, to identify a requirement of the recalibration, support points, such as 3D points on surfaces or platforms, are identified that are present in a background of a scene where the object to be dimensioned. In such cases, a change in the scene is detected based on comparing the identified support points in a background model with 3D points that are identified, in real-time, upon capturing multiple images of the scene. The detected change provides an estimation of a shift representing movement in position of the camera unit of the dimensioner, which obviously misbalances a frame of reference for which the dimensioner was initially calibrated. Accordingly, depending on the identified movement, a requirement for the recalibration of the dimensioners is identified, further, new reference points are determined and the dimensioner is recalibrated for the new reference points, before measuring dimensions of a next object.

However, such techniques require using platforms that have high number of support points for dimensioning objects, which inherently involves, by and again, removing objects, such as but not limited to, parcels, from a dimensioning platform by workers to validate readiness or recalibration of the dimensioner. Also, such techniques are not successful, when the background includes clutter and the camera unit of the dimensioner is not sensitive or adapted to detect a small change. Further, generally these dimensioners are used in material handling environments commonly having surfaces including, but not limited to, shiny metal scale, roller conveyor, ball-type scale etc., which are usually transient to platform materials and typically have a low number of support points. Such techniques only support accurate dimensioning of limited range of object types. For instance, using such techniques for dimensioning objects having non-cuboidal shapes, like prism shaped objects which are vertically or horizontally placed on the dimensioning platform, is in-efficient, complex, and error prone.

Various embodiments described herein illustrate techniques for accurately computing dimensions of an object using angular estimates associated with 3D points captured in an image of a scene including the object. In this regard, a camera unit of the dimensioner, captures at least one image of the scene associated with a field of view of the dimensioner and including the object to be dimensioned. The dimensioner then determines multiple 3D points from the captured images based on processing of the captured images. The 3D points herein, represent 3D coordinates of different points, for instance, points which may lie over the surface of the object and/or points on different surfaces captured in the scene. From the determined multiple 3D points, the dimensioner identifies "3D surface points", i.e. points on at least one surface of the object, as captured in the images. The 3D surface points, herein, are typically such points which are above a reference surface, for example, but not limited, to a ground plane, for which the dimensioner may be pre-calibrated. In this regard, an estimation of height for each 3D point from the multiple 3D points relative to the reference surface is performed. Further, one or more planes including at least three 3D surface points, defined by a set of neighboring 3D surface points which are from amongst the determined 3D surface points, are identified. Upon identification of the one or more planes, a surface plane from the one or more planes, which is coincident to a top surface of the object when viewed in the dimensioner's field of view is determined. The identified surface plane herein, represents "a plane of best fit" such that the surface plane covers a maximum of the 3D surface points on surface of the object. Thereafter, upon determining the surface plane representing the top surface of the object, angular estimates for the surface plane is determined, by the dimensioner. For determining the angular estimates, herein, a determination of a surface normal to the identified surface plane is done and an angle between a surface normal to the determined surface plane and a normal to the reference surface, is determined that represents the angular estimates. The angular estimates, in this regard, represents one interior angle of the object.

Once an interior angle of the object is determined using aforementioned approach, the dimensioner can compute the dimensions of the object using the determined angular estimates and an estimated height of the object.

According to another embodiment, two or more distribution of the angular estimates, i.e. angular offset values are computed for one or more planes along the set of neighboring 3D points on the surface of the object, at different intervals of time, and further analyzed. In this aspect, modes of distribution of the angular estimates, for analyzing are plotted on a graph, for example, a histogram. In accordance with some embodiments, two distributions of the angular estimates that are calculated at two instances of time respectively, by the dimensioners, are used to identify a movement experienced by a dimensioner. In this aspect, usually, the angular estimates between surface normals on various surfaces in the background of the scene and the reference surface normal, for example, a ground plane, are of values close to 0 degrees or 90 degrees. However, in situations, when the dimensioner experiences a motion, (for example, due to wear and tear or mishandling of the dimensioner), a frame of reference of the dimensioner is shifted, and accordingly a variation is observed in the angular estimates, i.e. angular values on the graph, representing the angular estimates. This variation, represented as angular offsets, is determined by the dimensioner, based on the analysis of the mode of distributions of the angular estimates, and used to identify motion data associated with the dimensioner. Accordingly, the dimensioner is recalibrated for new reference surface based on the identified motion data for computing the dimensions of the object.

Thus, by way of aforementioned approach, the dimensioner can firstly, accurately compute dimensions of even non-cuboid shaped objects, including, but not limited to, an isosceles triangle faced prism, and secondly, can be automatically recalibrated, whenever the dimensioner experiences a movement without any manual intervention including, but not limited to, stopping an ongoing dimensioning for recalibrating the dimensioner (in case the camera unit of the dimensioner sags due to mechanical constraints and experiences a motion).

Having described an example embodiment at a high level, the design of the various devices performing various example operations is provided below.

FIG. 1 schematically depicts an exemplary environment including a dimensioning system 100, in accordance with some embodiments described herein. The dimensioning system 100 herein is adapted to compute dimensions of an object in accordance with various embodiments described herein. According to an embodiment, the dimensioning system 100 may include a dimensioner 102 adapted to compute dimensions of an object 104 in a field of view 106 of the dimensioner 102. As illustrated, the object 104 may be placed on a platform 108, for example, but not limited to, a platform including weigh scale in a material handling environment. Illustratively, the dimensioner 102 may be adapted to communicate to a server 110, via a communication network 112. According to said embodiment, the dimensioner 102 may include including an illumination source 114 and one or more camera units 116-1, 116-2, and/or the like. In this regard, the illumination source 114 may correspond to a light source (e.g., laser, LED, etc.) for providing illumination in the field of view 106 of the dimensioner 102.

As illustrated, the dimensioner 102 may include one or more of, a memory 118, an object dimensioning unit 120, a communications circuitry 122, communicatively coupled to a processor 124. In some embodiments, the dimensioner 102 may further include input/output circuitry 126 for interacting with other systems, such as the server 110 within an environment of the dimensioning system 100 of FIG. 1. Illustratively, the dimensioner 102 may be configured to execute the operations described below in connection with FIGS. 6-8 described hereinafter in the description. Although these components are described with some functional descriptors, it may be understood that the particular implementations necessarily include the use of particular hardware. It may also be understood that certain of these components 118-122 may include similar or common hardware. For example, the dimensioner 102 may leverage use of the processor 124, memory 118, communications circuitry 122, and/or input/output circuitry 126 to perform their associated functions, and duplicate hardware is not required for the distinct components of the dimensioner 102 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" may be understood broadly to include hardware, in some embodiments, circuitry may also include software for configuring the hardware components of the dimensioner 102.

In some embodiments, the processor 124 (and/or co-processor or any other processing circuitry assisting or otherwise associated with the processor) may be in communication with the memory 118 via a bus for passing information among components of the apparatus. The processor 124 may be embodied in a number of different ways and may, for example, include one or more processing devices configured to perform independently. Additionally, or alternatively, the processor 124 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 124 may be configured to execute instructions stored in the memory 118 or otherwise accessible to the processor 124. Alternatively, or additionally, the processor 124 may be configured to execute hard-coded functionality. As such, whether configured by hardware or software methods, or by a combination of hardware with software, the processor 124 may represent an entity (e.g., physically embodied in circuitry) capable of performing operations according to an embodiment of the present invention while configured accordingly. Alternatively, as another example, when the processor 124 is embodied as an executor of software instructions, the instructions may specifically configure the processor 124 to perform the algorithms and/or operations described herein when the instructions are executed.

The memory 118 is non-transitory and may include, for example, one or more volatile and/or non-volatile memories. In other words, for example, the memory may be an electronic storage device (e.g., a computer readable storage medium). The memory 118 may be configured to store information, data, content, applications, instructions, or the like, for enabling the apparatus to carry out various functions in accordance with example embodiments contemplated herein.

The communications circuitry 122 may be any means such as a device or circuitry embodied in either hardware or a combination of hardware and software that is configured to receive and/or transmit data from/to a network and/or any other device, circuitry, or module in communication with the dimensioner 102. In this regard, the communications circuitry 122 may include, for example, a network interface for enabling communications with a wired or wireless communication network. For example, the communications circuitry 122 may include one or more network interface cards, antennae, buses, switches, routers, modems, and supporting hardware and/or software, or any other device suitable for enabling communications via a network. Additionally, or alternatively, the communications circuitry 122 may include the circuitry for interacting with the antenna(s) to cause transmission of signals via the antenna(s) or to handle receipt of signals received via the antenna(s). These signals may be transmitted by the dimensioner 102 over a network, such as the communication network 112 of FIG. 1, using a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it may be understood that these signals may be transmitted using Wi-Fi, Near Field Communications (NFC), Worldwide Interoperability for Microwave Access (WiMAX), or other proximity-based communications protocols.

In some embodiments, the dimensioner 102 may include the input/output circuitry 126 that may, in turn, be in communication with processor 124 to provide output to a worker and, in some embodiments, to receive an indication of worker input. The input/output circuitry 126 may comprise a user interface and may include a display that may include a web user interface, a mobile application, a client device, or the like. In some embodiments, the input/output circuitry 126 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 118, and/or the like).

In addition, the dimensioner 102 also comprises the object dimensioning unit 120, which includes hardware components designed to compute the dimensions of the object 104 based on angular estimates associated with various 3D points on a surface of the object 104. In an aspect, the object dimensioning unit 120 may utilize the processor 124, the memory 118, or other hardware component included in the dimensioner 102 to perform these functions. The object dimensioning unit 120 may further utilize the communications circuitry 122 to receive data from a variety of data sources.

Figure 2:
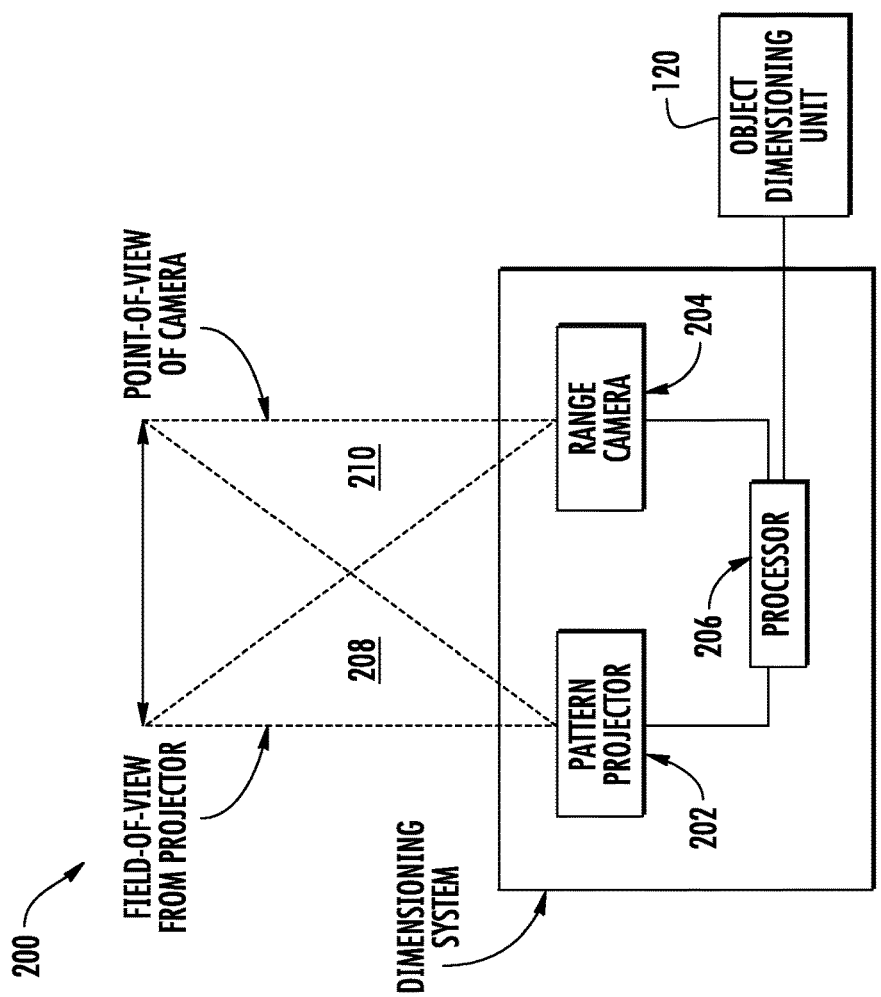
FIG. 2 schematically depicts a block diagram of a dimensioning system, in accordance with some example embodiments described herein.

FIG. 2 schematically depicts a block diagram of a dimensioning system 200, in accordance with one example embodiments described herein. In accordance with various embodiments described herein, the dimensioning system 200 may include a pattern projector 202 adapted to project a light pattern in a field of view of the dimensioning system 200 and a range camera 204 adapted to capture images of items placed in the field of view of the dimensioning system 200. In one embodiment, the dimensioning system 200 may also include a processor 206 adapted to access the images captured by the range camera 204 of the dimensioning system 200 and process the images to compute dimensions of the items. As illustrated, the dimensioning system 200 includes the pattern projector 202 which may be configured to project a light pattern (e.g., infrared light) into a field-of-view 208. In this aspect, the light pattern typically comprises points of light arranged in a pattern (i.e., point cloud). In accordance with various embodiments described herein, the points of light may be (i) sized identically or differently and (ii) may be arranged in some order or pseudo-randomly. In an aspect, the pattern projector 202 may create the light pattern using a light source (e.g., laser, LED, etc.), a pattern creator (e.g., a mask, a diffractive optical element, etc.), and one or more lenses. As illustrated, the dimensioning system 200 also includes the range camera 204 configured to capture an image of the projected light pattern that is reflected from the range camera's field-of-view 210. In this aspect, in accordance with various embodiments described herein, the light pattern may be projected on an object by the pattern projector 202, and the range camera 204 may capture a 2D image of the object along with the reflected project pattern from the object. Illustratively, the field-of-view 210 of the range camera 204 and the field-ofview 208 of the pattern projector 202 should overlap, but may not necessarily have identical shapes/sizes. In this aspect, the range camera 204 may include one or more lenses to form a real image of the field-of-view 210 onto an image sensor. In this regard, an image sensor (e.g., CMOS sensor, CCD sensor, etc.) may be used to create a digital image of the light pattern. The range camera 204 may also include the necessary processing component(s) (e.g. DSP, FPGA, ASIC, etc.) to obtain 3D data from the light pattern image.

In accordance with various embodiments described herein, light filtering (e.g., infrared filter) may also be used to help detect the reflected pattern by removing stray light and/or ambient light. As a non-limiting example, the range camera 204 may be based on one or more of: structured light, stereo vision, time-of-flight, the like, and/or combinations thereof. As illustrated, the dimensioning system 200 includes the processor 206, communicatively coupled to the pattern projector 202 and the range camera 204, and the object dimensioning unit 120, which is adapted to identify 3D points from the 2D images captured by the range camera 204. As described above, the 3D points may correspond to a geometric feature of the object for computing dimensions of the object.

Figure 3:
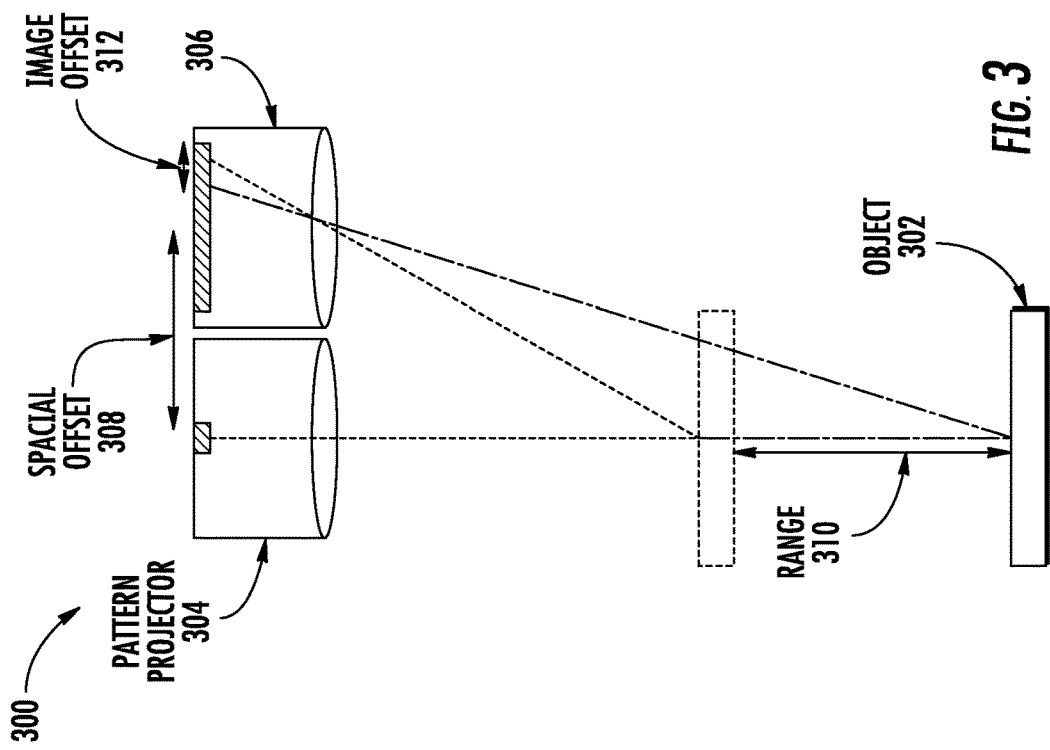
FIG. 3 graphically depicts a diagram illustrating sensing three dimensions of an object using a spatially offset pattern projector and a range camera, in accordance with some example embodiments described herein.
Figure 4:
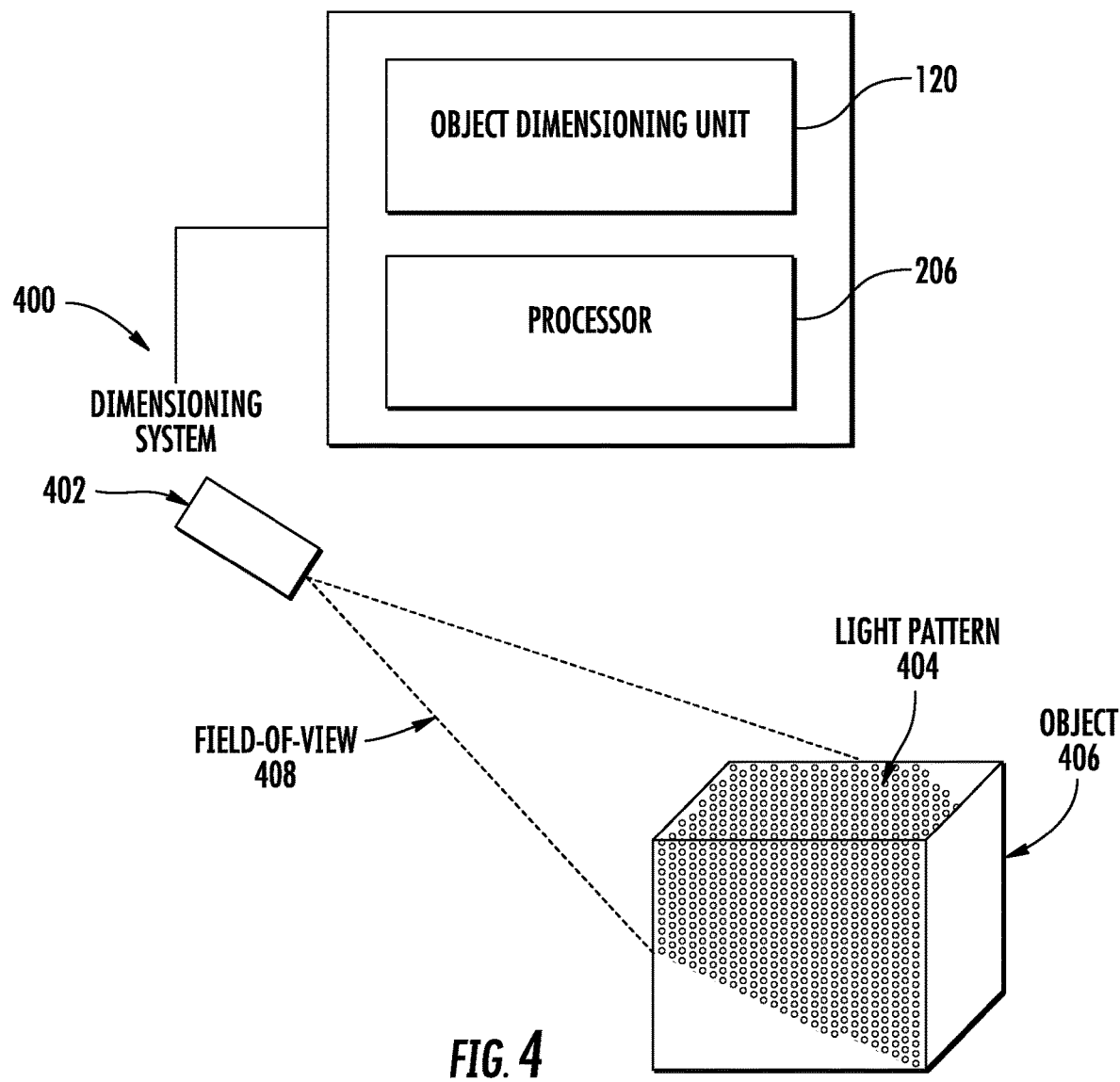
FIG. 4 illustrates an example implementation of a dimensioning system's pattern projector of the dimensioning system, in accordance with some example embodiments described herein.

FIG. 3 graphically depicts a diagram illustrating, a dimensioning system 300 including a dimensioner adapted for sensing three dimensions of an object 302 using a spatially offset pattern projector 304 and a range camera 306, in accordance with some example embodiments described herein. In this aspect, FIG. 3 illustrates an exemplary technique for retrieving multiple 3D points from multiple images, including the projected pattern of the object 302 as captured by the range camera 306. As shown in FIG. 3, the pattern projector 304 and the range camera 306 may be spatially offset (e.g., stereoscopically arranged). In this regard, the spatial offset 308 allows for changes in the range 310 of the object 302 to be detected as an image offset 312 on the range camera's image sensor. In accordance with various embodiments described herein, the spatial offset 308 may be adjusted to change the image offset 312, which changes the resolution at which range 310 differences may be detected. In this way, image offsets in a point-cloud pattern detected by the range camera 306 may be converted into 3D data for objects within the dimensioning system's field-of-view. In this regard, the 3D data includes range values for each point of light in the point-cloud image sensed by the range camera's 306 image sensors. Further, range values between the points of light in the point-cloud image may be interpolated to create a range image. In this regard, a range image is a gray scale image, in which each pixel value in the image corresponds to an estimated range between the dimensioning system and a point in the field-of-view. Thus, in accordance with various embodiments described herein, in operation, the range camera 306 may output 3D data in the form of point-cloud images or range images, including multiple 3D points representing three-dimensional coordinates of different points captured in the images by the range camera 306. FIG. 4 graphically depicts a dimensioning system 400, including an object dimensioner 402 which projects a light pattern 404 onto an object 406 in a field-of-view 408 of the object dimensioner 402. This depiction shows the dimensioning system 400 capturing a single view of the object 406. As illustrated, the dimensioning system 400 includes the processor 206 and the object dimensioning unit 120 for computing the dimensions of the object using range images as described in reference to FIG. 3.

Figure 5:
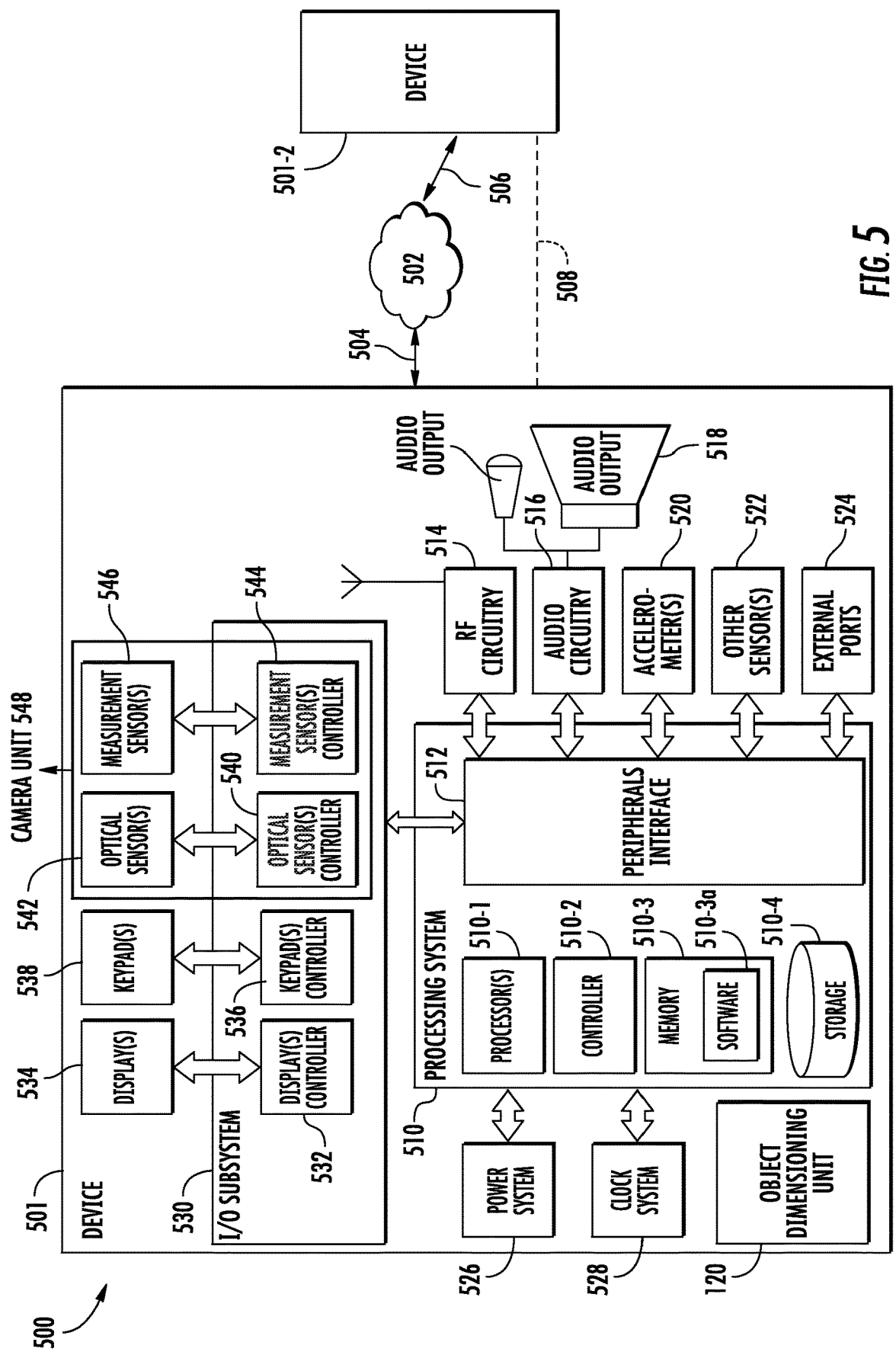
FIG. 5 is a block diagram illustrating various hardware elements of the dimensioning system in accordance with various example embodiments described herein.

FIG. 5 illustrates an exemplary dimensioning system 500 including a device 501, such as a mobile dimensioners device, in some embodiments of the present invention. The dimensioning system 500 may include other components not shown in FIG. 5, nor further discussed herein for the sake of brevity, such as additional hardware and software components. Illustratively, the device 501 may be configured to execute the operations described below in connection with FIGS. 6-8. In accordance with some example embodiments describe herein, the dimensioning system 500 may be implemented in any form of digital computer or mobile device. Digital computers may include, but are not limited to, laptops, desktops, workstations, fixed vehicle computers, vehicle mount computers, hazardous environment computers, rugged mobile computers, servers, blade servers, mainframes, other appropriate computers. Mobile devices may include, but are not limited to, cellular telephones, smart phones, personal digital assistants, tablets, netbooks, barcode scanners, radio frequency identification (RFID) readers, intelligent sensors, tracking devices, volume dimensioning devices, mobile dimensioners, and other similar computing devices.

In accordance with some embodiments described herein, the dimensioning system 500 of FIG. 5 can be connected to other devices, designated as "501-X." In one embodiment, the device 501 may be connected to another device 501-2 via a communication network 502, as illustrated. In this aspect, the communication network 502 may be any type of wide area network (WAN), such as the Internet, Local Area Network (LAN), or the like, or any combination thereof, and may include wired components, such as Ethernet, wireless components, such as LTE, Wi-Fi, Bluetooth, or near field communication (NFC), or both wired and wireless components, collectively represented by the data links 504 and 506. In other embodiments of the present invention, the device 501 may be connected to another device 501-2 via a wired communication channel 508. In this aspect, the wired communication channel 508 may be Universal Serial Bus (USB), Inter-Integrated Circuit (I2C), or other computer bus. In one embodiment, the device 501 is a mobile dimensioner device and the device 501-2 is a server than handles backend functions such as invoicing customers for packages being shipped in a material handling environment.

In accordance with various embodiments described herein, the device 501 of FIG. 5 may include a processing system 510 that may include one or more processors 510-1, such as Central Processing Units (CPUs), Application Specific Integrated Circuits (ASICs), and/or Field Programmable Gate Arrays (FPGAs), a memory controller 510-2, memory 510-3, which may include software 510-3a, and other components that are not shown for brevity, such as busses, etc. The processing system 510 may also include storage 510-4, such as a hard drive or solid state drive. In accordance with various example embodiments described herein, the device 501 may also include the object dimensioning unit 120 that may be adapted to identify 3D surface points from the images captured by a camera unit 548 of the device 501. In this regard, according to various embodiments described herein, one or more planes defined by neighboring 3D surface points from the identified 3D points and a surface plane including one or more of the identified 3D points, may be used for determining an interior angle of an object to be dimensioned by the device 501. Further details of identification of 3D surface points and computation of dimensions of the object are described in FIGS. 6-8. As illustrated, the camera unit 548 of the device 501 may be communicatively coupled to the processing system 510 and may include optical sensors, such as the optical sensors 542.

As illustrated, the processing system 510 may also include a peripherals interface 512 for communicating with other components of the device 501, including but not limited to, a radio frequency (RF) circuitry 514 (e.g. Wi-Fi and/or cellular communications circuitry such as for wireless Ethernet, Bluetooth, and near field communication (NFC)), an audio circuitry 516 with the audio input component (such as a microphone) and audio output component 518 (such as a speaker), one or more accelerometers 520, one or more other sensors 522 (such as a location determination component such as a Global Positioning System (GPS) chip), and one or more external ports 524 (which may be used for smart card readers or for wired connections such as wired Ethernet, USB, serial or I2C ports). In this aspect, the RF circuitry 514 and external ports 524 may individually and collectively make up the communication interfaces for the device 501. In an aspect, the processing system 510 may also be connected to a power system component 526 that may be used to power the device 501, such as a battery or a power supply unit. In an aspect, the processing system 510 may also be connected to a clock system component 528 that controls a timer for use by the disclosed embodiments.

Illustratively in accordance with various example embodiments described herein, the peripherals interface 512 may also communicate with an input/output (I/O) subsystem 530, which includes a display(s) controller 532 operative to control display(s) 534. In some embodiments, the display(s) 534 is a touch sensitive display system, and the display(s) controller 532 is further operative to process touch inputs on the touch sensitive display 534. The I/O sub-system 530 may also include a keypad(s) controller 536 operative to control keypad(s) 538 on the device 501. The I/O sub-system 530 may also include an optical sensor(s) controller 540 operative to control one or more optical sensor(s) 542. The optical sensor(s) 542 may include, but is not limited to, a barcode sensor, a camera, and an image sensor. The I/O sub-system 530 also includes a measurement sensor(s) controller 544 operative to control one or more measurement sensor(s) 546. The measurement sensor(s) may include, but is not limited to, a point-cloud projection sensor, a structured light sensor, a stereoscopic camera, and an n-scopic camera. In accordance with some embodiments, the optical sensors 542 may correspond to the camera units 116-1, 116-2 and/or the range camera 204 as described in reference to FIGS. 1 and 2 respectively. Accordingly, the measurement sensor(s) controller 544 may correspond to the dimensioner 102 as described in reference to FIG. 1. Illustratively, in an embodiment, at least one of the optical sensor controller 540, the optical sensors 542, the measurement sensor(s) controller 544, and/or the measurement sensors 546 may correspond to a camera unit 548 of the device 501. In accordance with various embodiments of present subject matter, the components of device 501 may be interconnected using one or more buses, represented generically by the arrows of FIG. 5, and may be mounted on a motherboard (not shown) or some other appropriate configuration.

Figure 6:
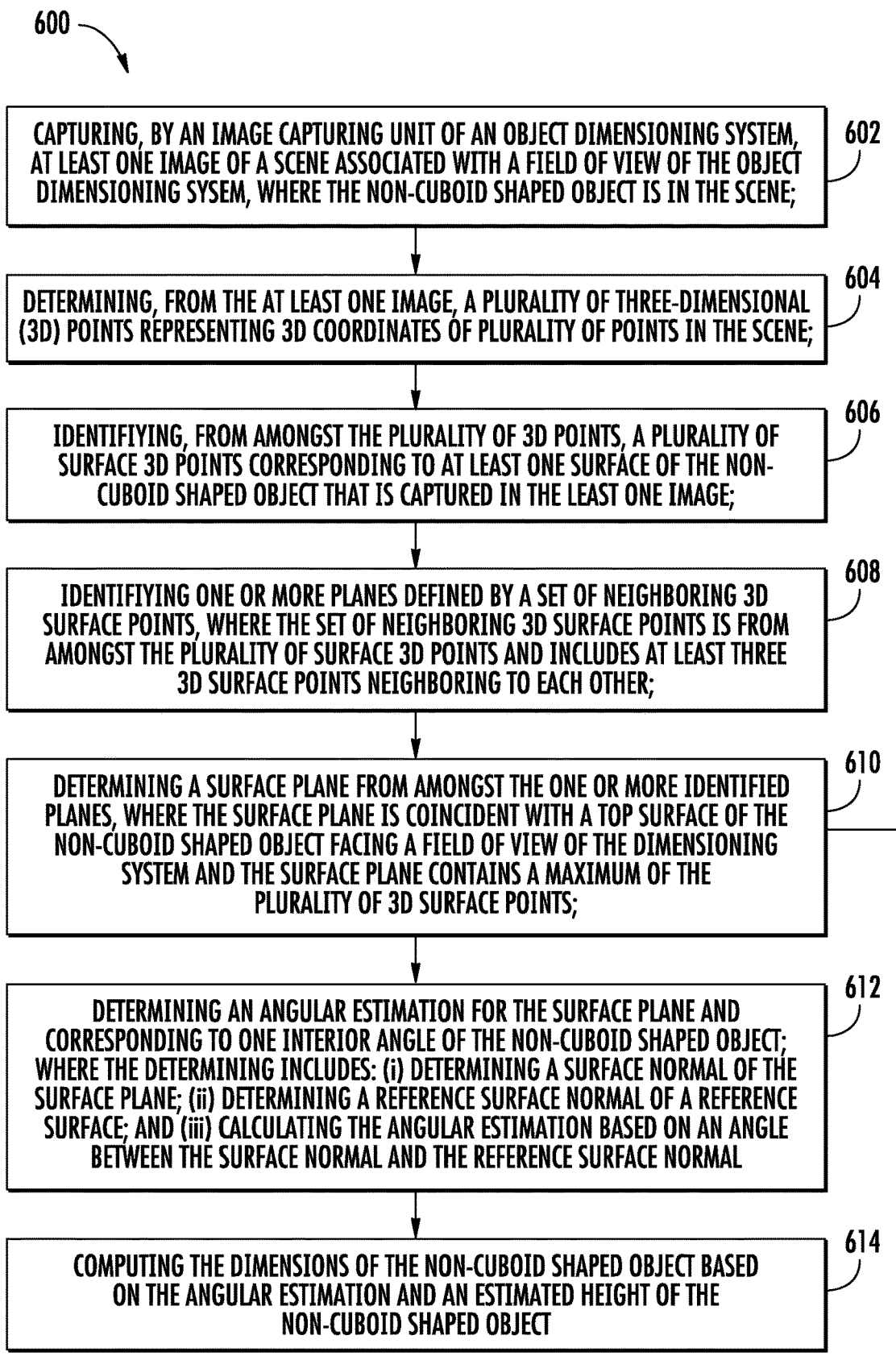
FIG. 6 illustrates a flowchart describing a method of computing dimensions of an object using angular estimates associated with 3D surface points on the object, in accordance with some example embodiments described herein.

FIG. 6 illustrates an example flowchart of operations performed by a dimensioning system (such as dimensioning systems 100, 200, 300, 400, and 500 of FIGS. 1-5) in accordance with example embodiments of the present invention. It will be understood that each block of the flowchart, and combinations of blocks in the flowchart, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 6, when executed, convert a computer or processing circuitry into a particular machine configured to perform an example embodiment of the present invention. Accordingly, the operation of FIG. 6 defines an algorithm for configuring a computer or processor, to perform an example embodiment. In some cases, a general-purpose computer may be provided with an instance of the processor which performs the algorithm of FIG. 6 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

At step 602, the device 501 of the dimensioning system 500 includes means, such as the camera unit 548, to capture at least one image of a scene including an object. In one embodiment, the object may be a non-cuboid shaped object, for example, but not limited to, an isosceles triangle prism shaped object. In this regard, the scene may be associated with a field of view of the camera unit 548 of the object dimensioning system, for instance, the dimensioning system 500 as illustrated in FIG. 5.

At step 604, the device 501 of the dimensioning system 500 includes means, such as the object dimensioning unit 120 coupled to the processing system 510, to determine from the at one captured image plurality of 3D points representing coordinates in three-dimensions (such as, but not limited to, coordinate axes: x-axis, y-axis, and z-axis) of multiple points in the scene. In this aspect, the plurality of 3D points may be representative of points on various objects and surfaces captured in the at least one image, including the object that is to be dimensioned. According to some example embodiments, the determining of multiple 3D points from the captured at least one image may be performed in a manner as described in FIG. 3, using components as described in reference to FIGS. 2-5, (e.g. based on (i) sensing by the camera unit 548, illustratively, by the optical sensors 542 and/or the measurement sensors 546, a reflection of a structured light pattern projected on the object by a pattern projector (for example, the pattern projector 202 of FIG. 2) along with the image frames with projected light pattern captured by the camera unit 548, and (ii) identifying image offsets in the point-cloud pattern detected by the camera unit 548 (for example, the range camera 204 of FIG. 2). Alternatively, in accordance with some embodiments, various other techniques based on such as, but not limited to time of flight estimation, triangulation or phase shift estimation, etc. may be used by the object dimensioning unit 120 of the device 501 for determining the plurality of 3D points from the captured at least one image.

At step 606, the device 501 of the dimensioning system 500 includes means, such as the object dimensioning unit 120, to identify a plurality of "3D surface points." In this regard, the plurality of 3D surface points may be from amongst the plurality of 3D points identified at step 604. The 3D surface points herein, indicate such points which are on a surface of the object that is to be dimensioned. For instance, the at least one image captured by the device 501 may include many points which represents 3D coordinates of different objects or surfaces and/or space representing the scene. However, only some points from all such 3D points may be located on the surface of the object. Accordingly, such 3D surface points are identified by the device 501.

In some example embodiments, the identification of the 3D surface points may include determining a height estimation for each of the 3D surface point relative to a reference surface for which the camera unit 548 of the device 501 is initially calibrated before performing operations related to dimensioning. It may be understood, that 3D points located at a defined height relative to the reference surface, for example, ground surface, may include the points located on the surface of the object. To determine the height estimation, in accordance with some embodiments, the object dimensioning unit 120 of the device 501, may compute a normal from each 3D point identified from the at least one captured image to the reference surface, and further, calculate a distance along the normal between the 3D point and the reference surface (i.e. a point on the reference surface where the normal intersects the reference surface). The calculated distance, herein, represents a height of each 3D point relative to the reference surface. In this regard, 3D points of which the calculated height is above a predefined threshold may be considered as the "3D surface points". The predefined threshold, in this regard, may correspond to a value which may be derived based on experimentation and/or may be a fixed value depending on a range of an image sensor of the camera unit 548. For instance, in an embodiment, the predefined threshold may be 40 mm above the reference surface. In accordance to various embodiments, the predefined threshold may depend on an application or environment in which the dimensioning of an object is being performed by the device 501. In some embodiments, upon identification of the plurality of 3D surface points, i.e. coordinates in three dimensions defining such 3D surface points, may be stored in a table representing a 3D matrix in a memory, such as the storage 510-4 and/or the memory 510-3 communicatively coupled to the processing system 510 of the device 501.

In some embodiments, the plurality of 3D points, may correspond to a geometric feature of the object, such as, but not limited to, corners, interest points, blobs or regions of interest point, edges, or ridges, from the captured image frames. Illustratively, in some embodiments, the geometric feature may be a distinguishing feature on the object, such as, but not limited to, a corner of a cuboid/box shape object, or a unique protrusion on a surface of the object etc. In this aspect, the identification of the 3D points may also involve using various interest point detection techniques, such as but not limited to, corner detection, edge detection, feature detection etc.

At step 608, the device 501 of the dimensioning system 500 includes means, such as the object dimensioning unit 120, to identify one or more planes defined by a set of neighboring 3D surface points. In this regard, the object dimensioning unit 120 may identify sets of neighboring 3D surface points, defined by at least three 3D surface points that are neighboring to each other. In this regard, identifying the one or more planes includes identifying such neighboring 3D surface points that define the one or more planes which best approximate a local 3D surface on the surface of the object to be dimensioned. In some examples, the object dimensioning unit 120 may perform a distance estimation amongst the at least three 3D surface points to consider the 3D surface points to be neighboring to each other. In other words, if each of the three 3D surface points is within a defined distance from each other, then such 3D surface points are considered as neighboring 3D surface points. Accordingly, the object dimensioning unit 120 identifies, sets, or clusters of such neighboring 3D surface points.

At step 610, the device 501 of the dimensioning system 500 includes means, such as the object dimensioning unit 120, to determine from amongst the one or more planes identified at step 608, a surface plane that is coincident with a top surface of the object to be dimensioned. In this regard, the top surface may represent a surface of the object which faces the field of view of the camera unit 548 of the device 501. In some embodiments, two surfaces of the object may be present in the field of view of the camera unit 548 of the device 501. In such cases, the object dimensioning unit 120 may determine one of the surfaces of the object from the two surfaces, on which most of the 3D surface points are present. Accordingly, the surface plane identified by the object dimensioning unit 120 may also contain a maximum number of the plurality of 3D surface points identified at step 606. In this regard, the identification of the surface plane may be performed by using various techniques, such as Random Sample Consensus (RANSAC), Hough transform, and/or the like. In an embodiment, RANSAC may be used to identify the surface plane that represents a "plane of best fit" i.e. a plane that covers sufficient number of the 3D surface points which are located on surface of the object. Further details of the determination of the surface plane are described in reference to FIG. 8.

At step 612, the device 501 of the dimensioning system 500 includes means, such as the object dimensioning unit 120, to determine an angular estimation for the surface plane determined at step 610, and corresponding to one interior angle of the non-cuboid shaped object. In this regard, the determination of the angular estimation may include: (i) determining a surface normal of the surface plane identified at step 610, (ii) determining a reference surface normal of a reference surface, for instance, a reference surface, including, but not limited to, a ground plane or a platform used for dimensioning objects, for which the camera unit 548 of the dimensioning system 500 may be calibrated before initiating the dimensioning of the object, and (iii) calculating the angular estimation based on an angle between the surface normal and the reference surface normal. In this regard, according to some embodiments, the angular estimation may represent an angle between a surface normal (i.e. a normal on the determined surface plane) and a reference surface normal (i.e. a normal on the reference surface for which the device 501 is calibrated). In this aspect, according to some embodiments, geometrically, this angle between the surface normal and the reference surface normal may be equivalent to one interior angle of the non-cuboid shaped object that is to be dimensioned. Alternatively, in some embodiments, upon the determination of angular estimates, i.e. the angle between the surface normal and the reference surface normal, geometrical techniques such as Pythagoras theorem, and/or various theorems for properties of polygons may be used to compute one interior angle of the non-cuboid shaped object. To this extent, according to said embodiments, the one interior angle computed by the object dimensioning unit 120, is the angle formed between two surfaces of the non-cuboid shaped object, facing the field of view of the device 501. Further, details of the estimation of angular estimates by the object dimensioning unit 120 are described in reference to FIG. 7.

At step 614, the device 501 of the dimensioning system includes means, such as the object dimensioning unit 120, to compute the dimensions of the object based on the angular estimates, determined at the step 612, and using an estimated height of the object. In this regard, the object dimensioning unit 120 may determine an estimated height of the object by computing a distance of each 3D surface point on the surface plane with the reference surface. In one embodiment, to determine the estimated height, the object dimensioning unit 120 may compute a normal between each of the 3D surface point on the identified surface plane to the reference surface. Further, a maximum value of the computed distances (i.e. distance between each 3D surface point on the object to the reference surface) may be identified and represents an estimation of the height of the object.

Further, upon determining an interior angle of the non-cuboid shaped object and the estimated height of the non-cuboid shaped object, the object dimensioning unit 120 may compute the dimensions of the non-cuboid shaped object. In this regard, in one embodiment, the object dimensioning unit 120 may compute values of all interior angles of the non-cuboid shaped object depending on a type of the non-cuboid shaped object. For example, according to an embodiment, in an instance, when the non-cuboid shaped object is an isosceles triangle prism shaped object (as two interior angles of the isosceles triangle shaped prism are equal), the object dimensioning unit 120 determines one interior angle of the prism based on the angular estimation, as described at step 612. The object dimensioning unit 120 may compute all interior angles of the isosceles triangle shaped object using various geometrical techniques. For instance, the object dimensioning unit 120 may compute the interior angles of the object based on a sum of interior angles of a regular polygon is (n−2), where "n" represents the number of faces of the polygon. Further, once all interior angles of the isosceles triangle prism shaped object are determined, other dimensions (such as, width and length of the isosceles triangle prism shaped object) may be computed by the object dimensioning unit 120 using the estimated height of the isosceles triangle prism shaped object.

Figure 7:
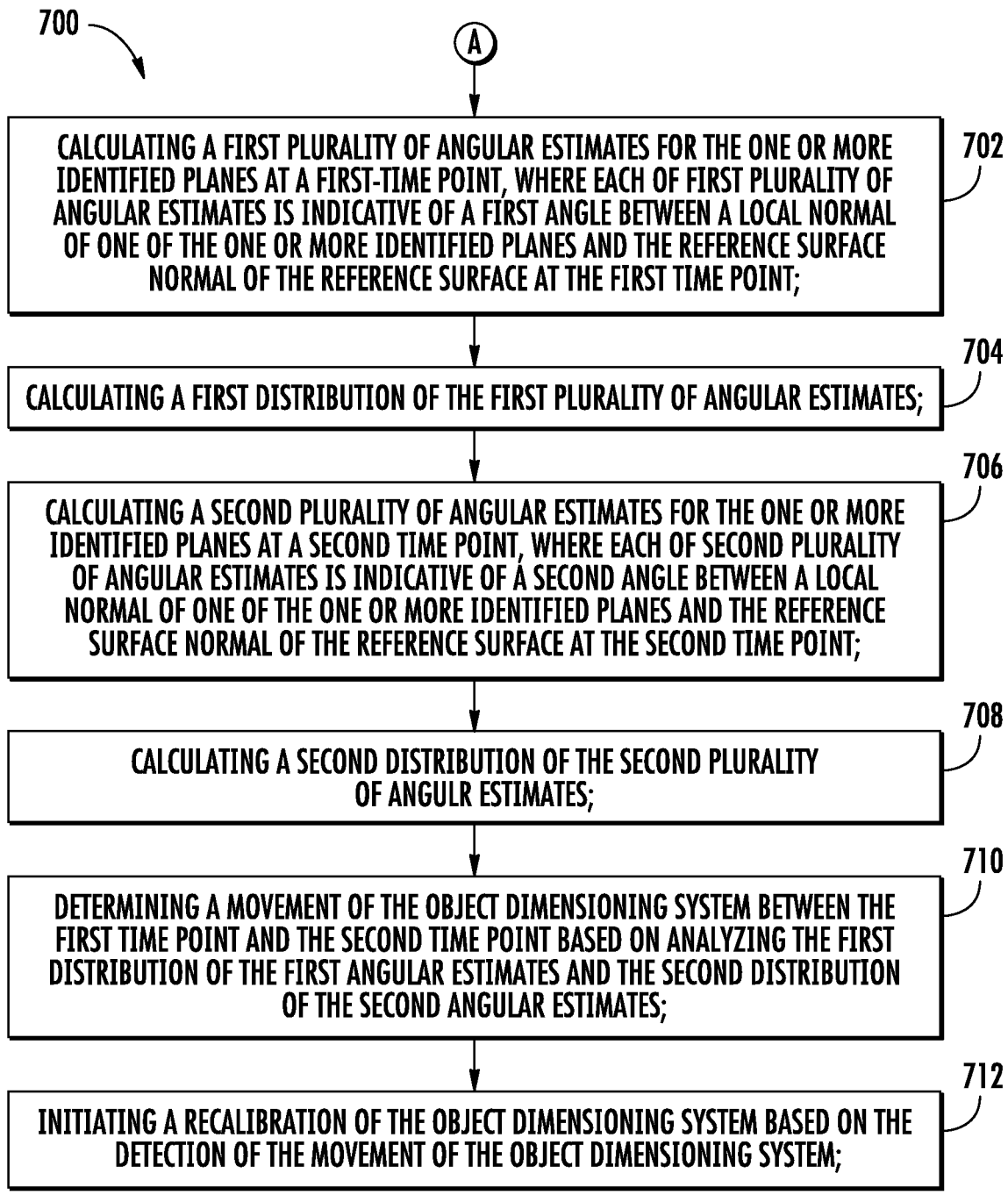
FIG. 7 illustrates a flowchart describing a method of detecting movement of the dimensioning system and recalibrating the dimensioning system, in accordance with some example embodiments described herein.

FIG. 7 illustrates an example flowchart of operations performed by a dimensioning system (such as dimensioning systems 100, 200, 300, 400, and 500 of FIGS. 1-5) for detecting a movement of a camera unit, for instance the camera unit 548, of the dimensioning system 500, and further recalibrating the dimensioning system, in accordance with another example embodiments. In this regard, upon determining an angular estimation for the surface plane as described at step 610 of FIG. 6, the processing system 510 of the device 501, performs an operation illustrated at step 702. At step 702, the device 501 of the dimensioning system includes means, such as the object dimensioning unit 120, to calculate a first plurality of angular estimates for the one or more identified planes at a first time point. In this regard, each of first plurality of angular estimates may be indicative of a first angle between a local normal of one of the one or more identified planes, (for instance, the one or more planes identified at step 608 as described in FIG. 6) and the reference surface normal of the reference surface at the first time point.

Figure 10:
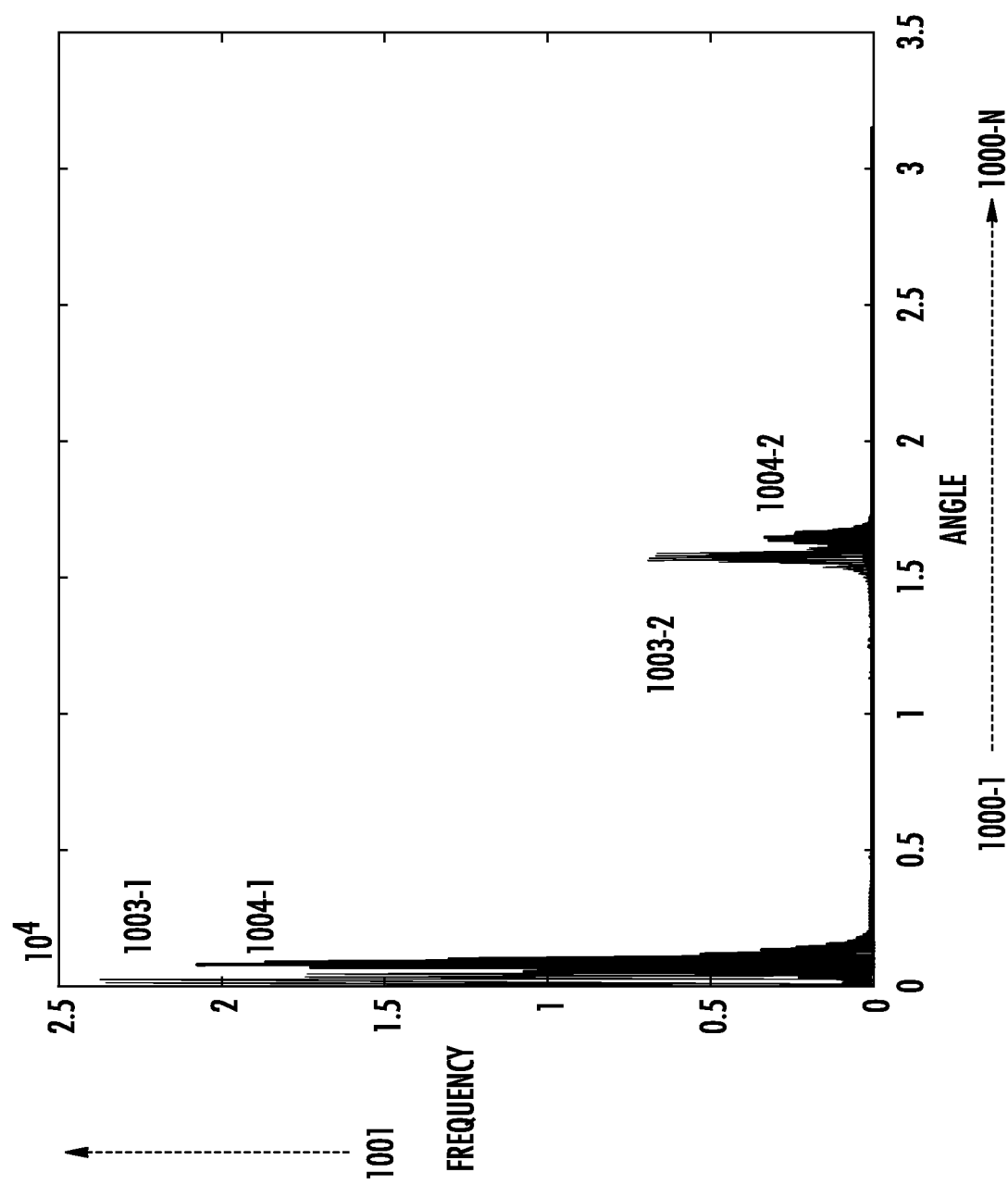
FIG. 10 illustrates a mode of graphical distribution of angular estimates associated with 3D surface points on the object, in accordance with some example embodiments described herein.

Further, at step 704, the object dimensioning unit 120 may calculate a first distribution of the first plurality of angular estimates identified at the first time point. The distribution, herein, may be represented in a graphical distribution, for example, a histogram. For instance, in an embodiment, the angular estimate (i.e. angular values between local surface normal for each of the identified planes on the non-cuboid shaped object and the reference surface) may be plotted on the histogram. FIG. 10, for example, illustrates, an example distribution of the angular estimates.

At step 706, the object dimensioning unit 120 may calculate a second plurality of angular estimates for the one or more identified planes at a second time point. Accordingly, herein, each of second plurality of angular estimates may be indicative of a second angle between a local normal of one of the one or more identified planes and the reference surface normal of the reference surface at the second time point.

Further, at step 708, the object dimensioning unit 120 may calculate a second distribution of the second plurality of angular estimates. In accordance with said embodiments, the object dimensioning unit 120 computes angular estimation at two different points in time. For instance, in an example, as described at step 704, the first distribution of the angular estimates may be computed in an instance when a user first calibrates the object dimensioning unit 120 of the device 501 (i.e. a first point in time). In this regard, the first point in time, in an example, may represent a time when a user first finds a reference surface (for instance, the platform 108 as illustrated in FIG. 1) or a ground plane for calibrating the device 501. Accordingly, the object dimensioning unit 120 may perform the calculation of the first distribution of the angular estimates at the first point in time. Similarly, the second distribution of the angular estimates may be computed, in an instance of time, when the device 501 has been in use for a period of time.

In this regard, surfaces on objects in a scene (including, for example, man-made environments including, but not limited to, a material handling environment or a distribution center, where multiple objects are present in a scene) have a lot of horizontal surfaces (tables, etc.) and vertical surfaces (walls, etc.). In this aspect, a measurement surface (for example, the platform 108, as illustrated in FIG. 1) on which the object is dimensioned is mostly horizontal. In such cases, a mode of distribution of the angular estimates when calculated during a point in time when the device 501 is calibrated is of certain angular values, which are mostly around 0 or 90 degrees. When distribution of the angular estimates including the angular values is plotted on a histogram, the histogram will have distribution of data representing large peaks at 0 and 90 degrees. The angular values between local surface normals and the reference surface normals in such cases are mostly around 0 degree or 90 degrees, corresponding to horizontal and vertical surfaces captured in an image of the scene. The second distribution, in this regard, is calculated sometime after the first distribution (for example, after the device 501, may have been displaced or moved from its original position (i.e. position of the device 501 when it was calibrated)).

In accordance with some embodiments described herein, the calculation of the first distribution of the first plurality of angular estimates, as described at step 704, and the calculation of the second distribution of the second plurality of angular estimates, as described at step 708, may further include, calculating, by the object dimensioning unit 120, one or more first modes of the first distribution and calculating one or more second modes of the second distribution respectively. Here, the processing system 510 of the device 510, via the object dimensioning unit 120, may analyze the first distribution and the second distribution to determine a shift between the one or more first modes and the one or more second modes. In this aspect, in instances, when the device 501 experiences any movement (for instance, due to mechanical strain or waggling of the device 501), the angular estimates calculated by the object dimensioning unit 120 (for example, the second distribution of the plurality of angular estimates, as described at step 708) represent a shift from the first distribution of the plurality of the angular estimates for same set of the identified planes. In this aspect, angular values in the angular estimates of the second mode of distribution are not values or data points on the histogram that are around 0 degree or 90; rather, it may be any value between zero degrees and 90 degrees. In this regard, the object dimensioning unit 120, at step 710, may determine a movement of the object dimensioning system between the first time point and the second time point based on analyzing the first distribution of the first angular estimates and the second distribution of the second angular estimates.

Accordingly, at step 710, the object dimensioning system 500 may include means such as the processing system 510 to determine a movement of the object dimensioning system between the first time point and the second time point based on analyzing the first distribution of the first angular estimates and the second distribution of the second angular estimates (i.e. based on determining a shift of the second distribution mode of angular estimates to the first distribution mode of the angular estimates as calculated at steps 704 and 708 respectively). In an example, the processing system 510 may determine a movement of the device 501, if the modes of first distribution and the second distribution are shifted to a significant amount (for example, but not limited to 0.02 radians).

In this regard, for dimensioning systems, angular estimates calculated during calibration of the dimensioning system (i.e. including angles between normal to a plane defined on a surface of an object that is positioned in a field of view of the object dimensioning system relative to the reference surface normal includes angular values) usually are angular values that are around zero degree or 90 degrees. However, when the camera unit 548 of the device 501 (dimensioning device) experiences a movement, a frame of reference of the camera unit 548 that identifies the reference surface in its field of view, during its calibration, is changed. For this reason, there is a shift in distribution of the angular estimates. To this extent, as the angular values from the first distribution of first angular estimates and the second distribution of the second angular estimates calculated at different points in time, are plotted, for example, on a histogram, presence of a motion or change in a positioning of the device 501 due to the movement, is identified by the processing system 510 of the device 501.

In accordance with some embodiments described herein, the movement determined by the processing system 510, may be based on one or more movement parameters that may include displacement values (for instance, values in x, y, and z coordinate planes), where the displacement values are indicative of displacement of at least one of the device 501 (including the camera unit 548) and/or an object with respect to each other, caused by the movement of the device 501 and/or the object while capturing the at least one image of the object. In accordance with said embodiment, the one or more movement parameters may also include angular orientation parameters including values corresponding to rotation angles, (i.e. a pitch, a yaw, and a roll) experienced by the device 501, during the movement of the device 501 including the camera unit 548. In accordance with various example embodiments, the movement parameters, including, but not limited to, displacement values (x, y, and z) and the rotation angles, which may be determined by the processing system 510 via at least one of the optical sensors 542, the measurement sensors 546, the one or more accelerometers 520, and/or the other sensors 522 illustrated in FIG. 5.

Further, upon determination of the movement, at step 712, the device 501 of the dimensioning system 500 includes means, such as the processing system 510, to initiate a recalibration of the device 501. In this regard, the processing system 510 of the device 501 for initiating the recalibration, may trigger a control command to the object dimensioning unit 120, to stop an ongoing dimensioning operation. In some embodiments, the processing system 510 of the device 501 may provide an alert to a user, where the alert is indicative of the recalibration of the device 501. In such cases, the processing system 510 of the device 501 may provide the alert by triggering a control command to one or more of, the peripherals interface 512 or the I/O sub-system 530. In this respect, the alert may be provided, via any of, the audio output of the audio circuitry 516 and/or the display 534 of the device 501. The alert, according to said embodiments, may be in form of at least one of: a text message, a voice based instruction, and/or a haptic feedback, provided via various components coupled to the peripherals interface 512 of the dimensioning device 501. In some embodiments, the alert may also be transmitted via either of the communication network 502 or the wired communication channel 508 to the device 501-2, for example, an external device including, but not limited to, a mobile device or personal digital assistant (PDA) used by the operator.

In an embodiment, the device 501 of the dimensioning system 500 includes means, such as the processing system 510, to perform recalibration of the device 501, which may include capturing via the camera unit 548 of the device 501, at least one image of a new reference surface for which the camera unit 548 of the device 501 is to be calibrated. Recalibration may involve identifying multiple 3D points from the at least image of the new reference surface captured by the camera unit 548 and storing in the memory 510-3 the multiple 3D points identified on the new reference surface. Such reference 3D points stored by the processing system 510 in the memory 510-3 may be accessed by the processing system 510 at a later stage for various operations. In this regard, in an embodiment, the device 501 may be repositioned relative to the new reference surface. The reference surface may correspond to one of: a ground plane, a platform (such as the platform 108 as illustrated in FIG. 1) for placing the object to be dimensioned. Accordingly, the camera unit 548 may be recalibrated for the new reference surface.

Figure 8:
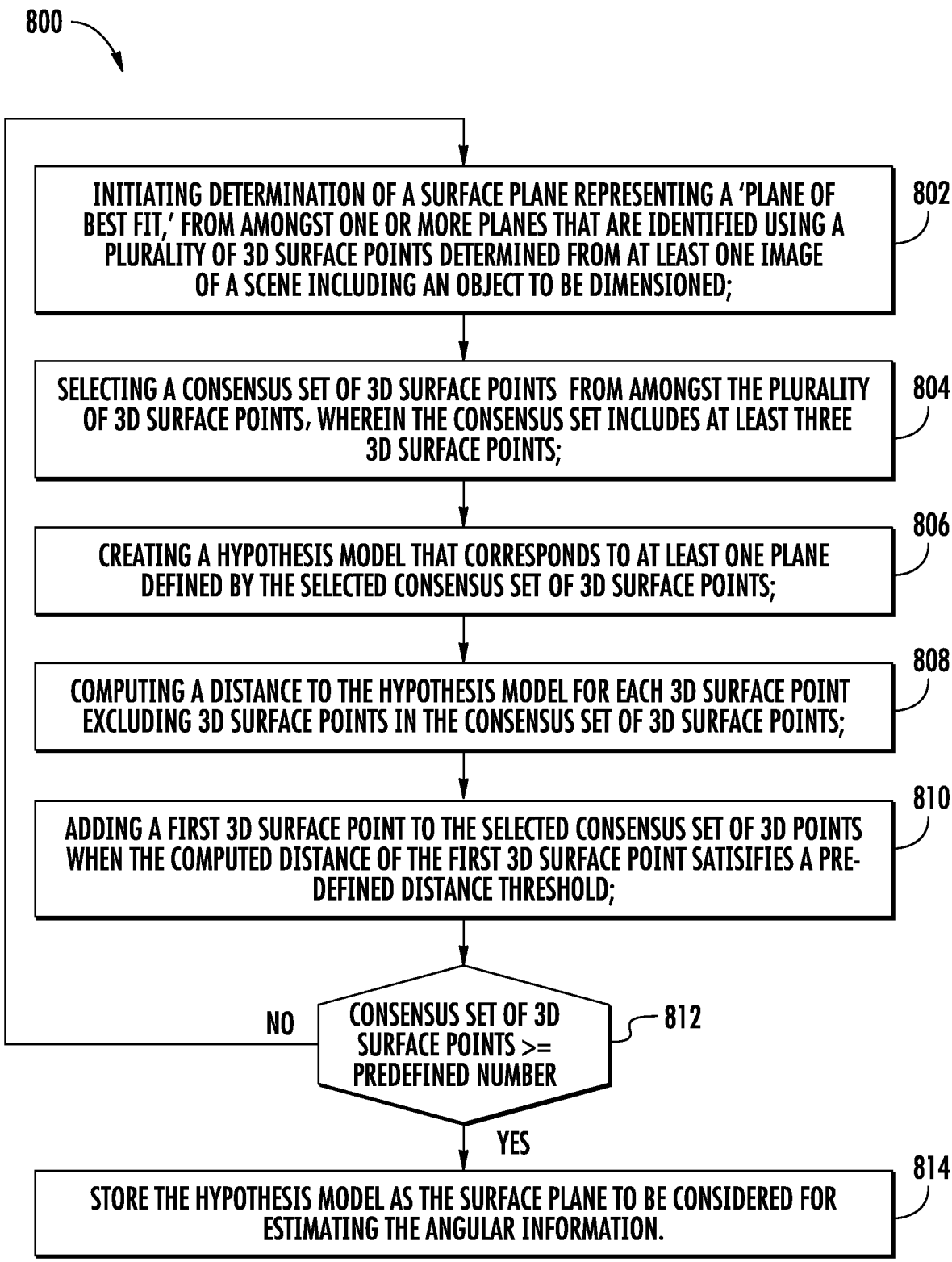
FIG. 8 illustrates a flowchart describing a method of identifying a surface plane from one or more planes identified by the dimensioning system, in accordance with some example embodiments described herein.

FIG. 8 illustrates a flowchart describing a method of determining a surface plane from one or more planes identified by the dimensioning system using RANSAC, in accordance with some example embodiments described herein. In this aspect, the determination of the surface plane is based on processing 3D data representing 3D surface points, (for instance, the 3D surface points identified at step 606 of FIG. 6), in order to estimate, at each depth point, an orientation of a planar surface which best approximates a local 3D surface on the non-cuboid shaped object that is to be dimensioned. In this regard, as illustrated, at step 802, the device 501 of the dimensioning system includes means, such as the object dimensioning unit 120, to initiate determination of a surface plane representing a "plane of best fit." In this regard, in some embodiments, the surface plane may be determined one amongst one or more planes that are identified at step 608, as illustrated in FIG. 6. In alternate embodiments, the surface plane may be a different plane than the one or more identified planes which may be determined by the object dimensioning unit 120 using the RANSAC technique.

As illustrated, at step 804, the device 501 of the dimensioning system includes means, such as the object dimensioning unit 120, to select a consensus set of 3D surface points, from amongst plurality of 3D surface points, for instance, the 3D surface points identified at step 606, illustrated in FIG. 6. The consensus set of 3D surface points may include at least three 3D points which are located on the surface of the object. In this regard, in one embodiment, the object dimensioning unit 120 may select any three 3D points located on the surface of the object that is present in at least one image of the object captured by the camera unit 548 of the device 501.

At step 806, upon selecting the consensus set of 3D surface points, the object dimensioning unit 120, may create a hypothesis model, using techniques, such that the hypothesis model may represent a plane defined by the consensus set of 3D surface points.

At step 808, the object dimensioning unit 120, may compute a distance to the hypothesis model. In this aspect, the distance may be predefined based on a statistical analysis of values. In some embodiments, a standard deviation of the 3D surface points from a plane of best fit representing a surface of the object may be determined to compute the distance. For instance, in an embodiment, the distance may be 10 mm, i.e. 10 mm variation or deviation to the hypothesis model at an instance of time. Thereafter, the object dimensioning unit 120, as illustrated at step 810, may add a first 3D surface point to the selected consensus set of 3D surface points, in cases, when the computed distance of the first 3D surface point satisfies a predefined threshold. The predefined threshold, herein, may depend on a range of image sensor of the image capturing unit, for instance the camera unit 548 of the device 501. For example, in an embodiment, the predefined threshold value may be 1 cm, i.e. the distance computed to the hypothesis model may be 1 cm. In this way, as the object dimensioning unit 120 determines that the computed distance for any 3D surface point.

At step 812, the object dimensioning unit 120, may perform a check to determine if the 3D surface points in the consensus set of 3D surface points are greater than or equal to a predefined number or not. In this regard, a value of the predefined number may again depend on the range of the image sensor, i.e. the camera unit 548 of the device 501. For example, in an embodiment, the predefined number may be 1000, i.e. at least 1000 3D surface points may be present in the consensus set of the 3D surface points. In an instance, if the determination results positive, i.e. the 3D surface points in the consensus set of 3D surface points are greater than or equal to a predefined number, then a control of operation, moves to step 814. In an instance, if the determination results negative, i.e. the 3D surface points in the consensus set of 3D surface points are not greater than nor equal to a predefined number, then the object dimensioning unit 120 repeat the steps 802-808, until the check performed by the object dimensioning unit 120 at step 808 is positive.

At step 812, in an instance, when the check performed by the object dimensioning unit 120 results positive, the device 501, may include means such as the processing system 510 to store the hypothesis model as the surface plane that is to be considered for estimating the angular estimates, as described at step 612 of FIG. 6. In this aspect, the hypothesis model may be stored in a storage medium, such as the memory 510-3 or the storage 510-4, and may be further accessed by the object dimensioning unit 120, for computing the angular estimates of the surface plane defined using the hypothesis model. In this regard, the surface plane defined by the stored hypothesis model is such that the surface plane is coincident with a top surface of the object which faces the field of view of the camera unit 548 of the device 501. Also, the surface plane may contain a maximum number of 3D points on the surface of the object faced in the field of view. Further, the angular estimates estimated from the surface plane herein, geometrically represents an interior angle of the object which may be used by the object dimensioning unit 120 to compute the dimensions of the object.

Figure 9:
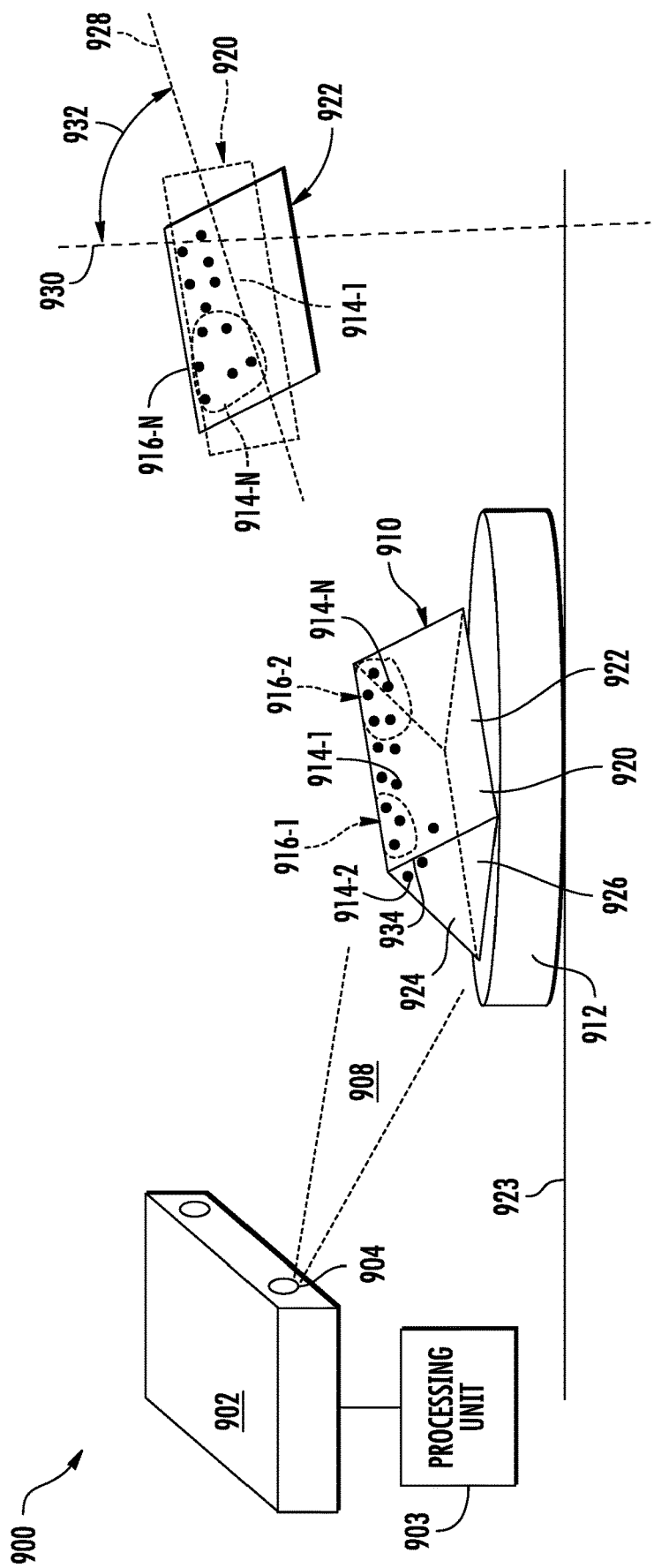
FIG. 9 illustrates an exemplary scenario of a system for computing dimensions of an object based on angular estimates associated with 3D surface points on the object, in accordance with various embodiments described herein.

FIG. 9 illustrates an exemplary scenario of a dimensioning system 900 for computing dimensions of an object by using angular estimates associated with various points on a surface of a non-cuboidal shaped object, in accordance with some example embodiments described herein. In this aspect, the example scenario of the system 900 as illustrated in FIG. 9 is representative of the steps 602-614 of FIG. 6 performed by the device 501 for computing dimensions of an object. As illustrated, a dimensioner device 902, similar to the device 501, may include an illumination source, (for example, the pattern projector 202 as described in reference to FIG. 2) and a camera unit 904 (for example, the range camera 204 or the camera unit 548, as illustrated in FIGS. 2 and 5 respectively). In an embodiment, the dimensioner device 902 may project an illumination from the illumination source, for instance, a structured light pattern from the pattern projector 202, in a field of view 908 of the dimensioner device 902. Accordingly, the camera unit 904 may capture at least one image of an environment including the non-cuboid shaped object 910 and a reflection of the projected pattern on the object. As illustrated, the non-cuboid shaped object herein is an isosceles triangle faced prism shaped object which is placed horizontally over a dimensioning platform 912. In this regard, the dimensioning platform 912 may be positioned over a reference surface 923 for which the dimensioner device 902 is calibrated. According to various embodiments, the dimensioning platform 912 may correspond to a weigh scale, or an item accumulation zone along a conveyor or a sorter, where the items are positioned for dimensioning, in a material handling environment. In some embodiments, the reference surface 923 herein may be a ground surface on which the platform is positioned, or may also be a conveyor bed. In alternate embodiments, a surface plane along the dimensioning platform 912 may itself be considered as the reference surface 923.

As illustrated, there may be multiple points 914-1, 914-2 . . . 914-N that may be present on a surface of the non-cuboid shaped object 910. In this regard, a processing unit 903 (for example, the processing system 510 of the device 501) may determine multiple 3D points from the at least one image of the non-cuboid shaped object, captured by the camera unit 904. In this regard, the multiple 3D points may include some 3D points that may be located outside the non-cuboid shaped object 910, along with 3D surface points 914-1, 914-2 . . . 914-N that are located on the non-cuboid shaped object 910. The processing unit 903 may identify the 3D surface points 914-1, 914-2 . . . 914-N, i.e. points representing coordinates in three dimensions and located on the surface of the non-cuboid shaped object 910, based on an estimation of height of each 3D surface point 914-1, 914-2 . . . 914-N relative to the reference surface 923. Accordingly, such 3D points that are above a predefined height from the reference surface 923 may be considered for being identified as the 3D surface points, by the processing unit 903. Upon identification of the 3D surface points 914-1, 914-2 . . . 914-N, the processing unit 903 of the dimensioner device 902 may identify one or more planes 916-1, 916-2 . . . 916-N that are defined by sets of neighboring 3D surface points. The sets of neighboring 3D surface points herein may be such that the set may include at least three 3D surface points neighboring to each other. Further, the planes 916-1, 912-916-N may be identified using various techniques. For instance, in an embodiment, the planes 916-1, 912-2 . . . 916-N may be identified using simple vector mathematics. In this regard, the processing unit 903, may access at least three 3D surface points, for example, P1 (x1, y1, z1) illustrated as 914-1; P2 (x2, y2, z2) illustrated as 914-2; and P3 (x3, y3, z3) illustrated as 914-3; and compute a cross product of a vector P1P2 and vector P2P3 which would be such that, the cross product would result in a vector that is perpendicular to both P1P2, P2,P3, and the plane defined by P1, P2, and P3. Accordingly, the processing unit 903 identify the one or more planes 916-1, 916-2 . . . 916-N defined by the 3D surface points 914-1, 914-2, 914-3 . . . 914-N that satisfy aforementioned vector condition. Alternatively, the processing unit 903, may use other mathematical approaches to identify the one or more planes defined by the sets of neighboring 3D surface points.

Upon identifying the one or more planes 916-1, 916-2 . . . 916-N, the processing unit 903 may further determine a surface plane 920, representative of a "plane of best fit," from amongst the one or more identified planes 916-1, 916-2 . . . 916-N. The non-cuboid shaped object 910 may have one or more surfaces, for instance, side surfaces 922, 924 and a bottom surface 926 resting on the platform 912. For the purpose of illustrating various components of the dimensioner device 902, FIG. 9 shows the dimensioner device 902 is placed on the side of the non-cuboid shaped object 910. In various embodiments of the present invention, the dimensioner device 902 can be moved so that side surfaces 922 and 924 are facing the camera unit 904 in the field of view 908 of the dimensioner device 902.

In some embodiments, the surface plane 920 herein, determined by the processing unit 903, may be such that it may be coincident with a top surface (such any one of the surfaces 922 and the surface 924) facing a field of view 908 of the dimensioner device 902, and may contain a maximum of the 3D surface points 914-1, 914-2, 914-3 . . . 914-N. In this regard, the processing unit 903 may consider any one surface, for instance the surface 922 or the surface 924 as the top surface, depending on a number of 3D surface points identified by the processing unit 903 from the captured at least one image. In accordance with said embodiment, the processing unit 903, may determine an angular estimation, for instance, as described at step 610 of FIG. 6, for the surface plane corresponding to surface 922. The angular estimates herein, indicates an angle 932 between a surface normal 928 to the determined surface plane corresponding to surface 922 and a reference surface normal 930 to the reference surface 923. Geometrically, the angle 932 is equivalent to an interior angle 934 of the non-cuboid shaped object 910. Accordingly, based on estimation of the angular estimates, i.e. the interior angle 934 of the non-cuboid shaped object 910, the processing unit 903, may further compute the dimensions of the non-cuboid shaped object, for instance, using techniques as described at the step 614 of FIG. 6.

FIG. 10 illustrates a graphical mode of distribution of angular estimates associated with 3D surface points on the object, in accordance with some example embodiments described herein. A distribution such as, a histogram representing a distribution of angular values 1000-1 . . . 1000-N on X axis vs. frequency 1001 of such angular values on Y axis, is illustrated. In this regard, the angular values 1000-1 . . . 1000-N, herein, may correspond to one of first plurality of angular estimates and/or second plurality of angular estimates, as calculated at steps 704 and 708 respectively of FIG. 7. As illustrated, a first mode of the distribution of the first plurality of angular estimates 1003-1 and 1003-2 herein represents angular values calculated at first time point (for instance, at a time of calibrating a dimensioning system) and a second mode of the distribution of the second plurality of angular estimates 1004-1 and 1004-2 herein represents angular values calculated at second point of time (for instance, sometime after initial calibration when the dimensioning system is in operation). It may be understood here that the angular estimates herein, represents angular values, i.e. an angle between a normal to one or more identified planes against a reference surface normal, as described at step 612 of FIG. 6. In an example, a histogram distribution with bins of width 0.01 radians and a domain from 0 to pi radians for angular values may be considered for analyzing the first mode of distribution of the angular estimates and the second mode of distribution of the angular estimates. Accordingly, the angular values representing the angular estimates are plotted on the histogram and analyzed to determine a movement associated with the dimensioning system, (such as the dimensioning systems 100, 200, 300, 400, and 500, as illustrated in FIGS. 1-5) using techniques as described at step 710 of FIG. 7.

Figure 11:
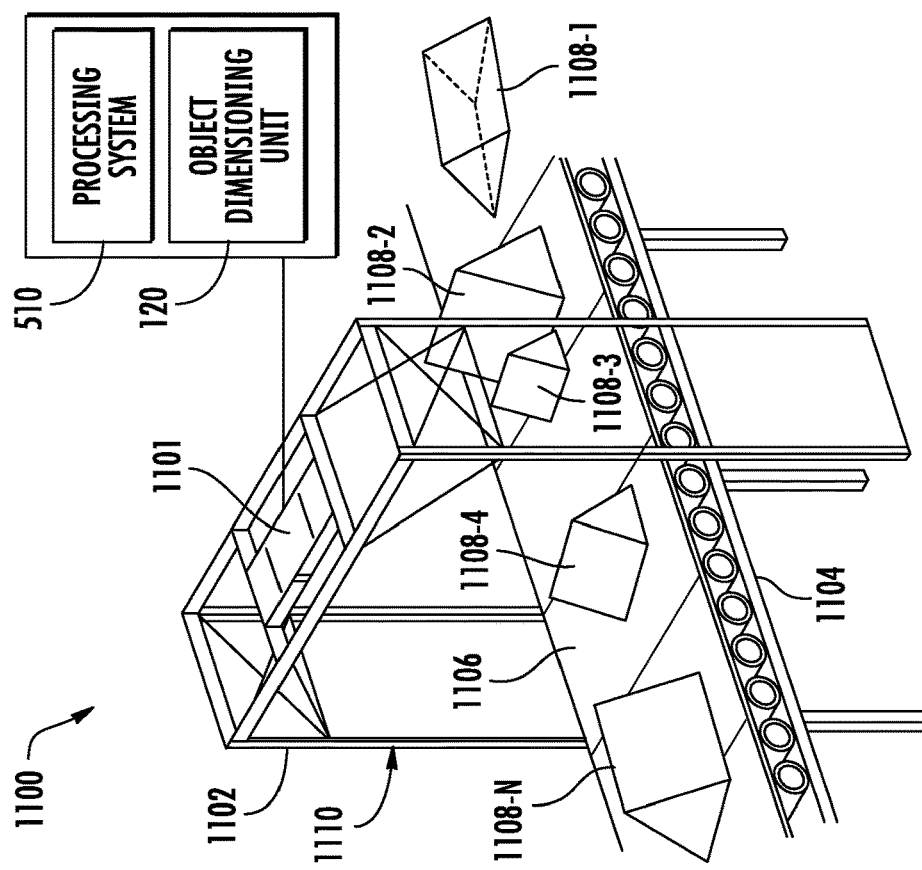
FIG. 11 illustrates an example environment where the dimensioning system may be installed for computing the dimensions of various objects, in accordance with some example embodiments described herein.

FIG. 11 illustrates an example environment 1100 where a dimensioner device 1101 (such as the device 501 of FIG. 5) may be installed for computing the dimensions of various objects, in accordance with some example embodiments described herein. As illustrated, a dimensioning station 1102 is positioned at a fixed location along a conveyor system 1104 in a material handling environment, such as, but not limited to, a warehouse, an inventory, or a shipping center. In some embodiments, the conveyor system 1104 may contain a conveyor belt 1106, which provides not only a level surface on which the objects can travel, but also an optical reference background for the dimensioner device 1101. As illustrated, in such material handling environment, objects 1108-1, 1108-2, 1108-3, 1108-4 . . . 1108-N are conveyed along the conveyor system 1104 for various operations such as shipping, inventory storage or transport. In this aspect, some of the objects 1108-1, 1108-2, 1108-3, 1108-4 may be non-cuboid shaped object, for example, the object 1108-1 is an isosceles triangle face prism shaped object for which two opposite faces are in shape of an isosceles triangle. Illustratively, the dimensioning station 1102 further includes a support structure 1110 that supports the dimensioner device 1101, which is positioned above a section of the conveyor system 1104. The support structure 1110 and the dimensioner device 1101 can be installed as shown or in any number of suitable configurations.

In this aspect, the dimensioner device 1101 includes imaging and sensing components (such as components 502-548 as described in reference to FIG. 5) for capturing images of the objects 1108-1, 1108-2, 1108-3, 1108-4 . . . 1108-N, as these objects pass below the dimensioner device 1101 on the conveyor belt 1106. In an embodiment, the dimensioner device 1101 includes the object dimensioning unit 120 to compute the dimensions of the objects 1108-1, 1108-2, 1108-3 . . . 1108-N, based on performing the operations described at steps 602-614 of the method 600 in reference to FIG. 6. In some embodiments, the dimensioner device 1101 is in a fixed position above the conveyor system 1104. In some embodiments, the dimensioner device 1101 can be tuned according to a predetermined distance from the dimensioner device 1101 to a bottom surface (e.g., the conveyor system 1104). In this regard, by imaging at least one surface, such as a top surface, of the objects 1108-1, 1108-2, 1108-3, 1108-4 . . . 1108-N, the dimensioner device 1101 may determine volumetric dimensions of the objects.

Illustratively, in accordance with various embodiments describe herein, for capturing the image frames of the objects, the dimensioner device 1101 and/or the objects 1108-1, 1108-2, 1108-3, 1108-4 . . . 1108-N may be moved for capturing the image frames from different viewpoints. In this regard, the dimensioner device 1101 may be coupled to movement devices (e.g., actuators, motors, turn-tables, flippers, pushers, robotic arms, etc.) that adjust a spatial relationship between the dimensioner device 1101 and the objects 1108-1, 1108-2, 1108-3, 1108-4 . . . 1108-N. In this regard, in accordance with various embodiments described herein, the dimensioner device 1101 may provide notifications indicative of error in object dimensioning. The notifications, in this aspect, may be provided based on a detection of change in a configuration of the object, for instance, but not limited to, a usual shape or standard dimensions for a type of the object that is being dimensioned by the dimensioning system, while capturing the multiple image frames. Alternatively, the notifications may also be based on detection of a movement, for instance, a mechanical strain or shaking experienced by the dimensioner device 1101. In this regard, the movement of the dimensioner device 1101 may be determined based on step 710 as described in FIG. 7. In accordance with some embodiments, the notifications, may be in form of at least one of a text message, a voice based instruction, and/or a haptic feedback, provided via various components coupled to the peripherals interface 512 of the dimensioning device 501.

Figure 12:
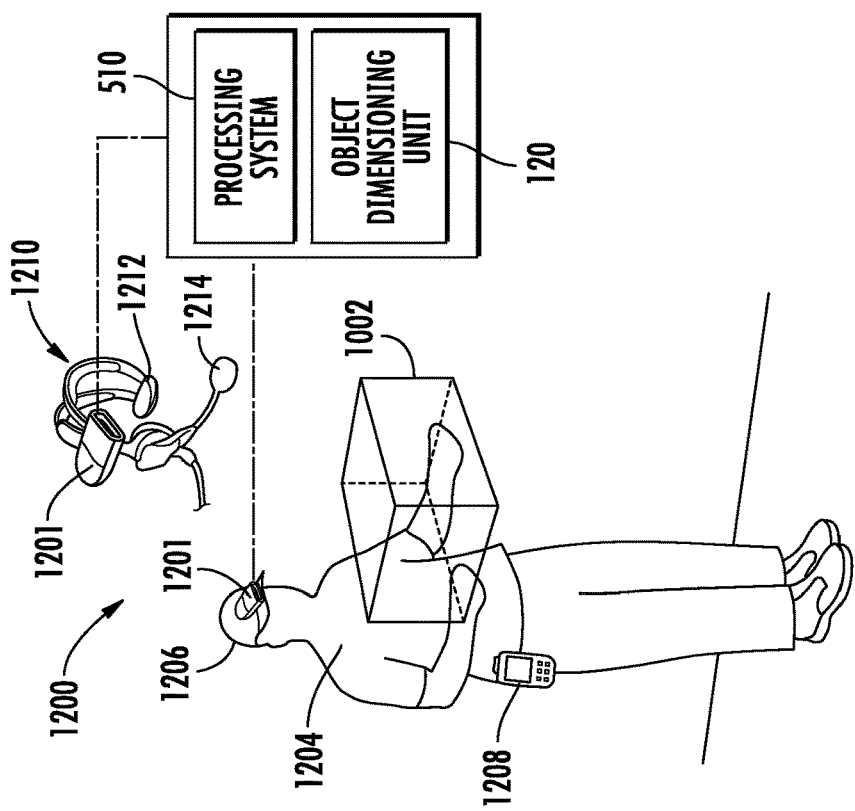
FIG. 12 illustrates a wearable dimensioning system adapted to compute dimensions of an object using range images, in accordance with some example embodiments described herein.

FIG. 12 illustrates a wearable dimensioning system 1200 adapted to compute dimensions of an object 1202 using angular estimates associated with multiple 3D points on a surface of the object 1202, in accordance with some example embodiments described herein. In this regard, as illustrated in FIG. 12, when a user 1204 wears the headgear 1206 that may be equipped with a dimensioner device 1201 (such as the device 501 of FIG. 5), the user 1204 may utilize the dimensioner device 1201, essentially hands-free, to make different types of dimensioning measurements of the object 1202. In this implementation, the user 1204 holds the object 1202, such as a shipment package to be measured while standing on ground. As illustrated, the user 1204 may also wear a portable control unit 1208 or an electronic device, such as a personal digital terminal (PDT) including a keypad, buttons, switches, or other input mechanisms. Also, as mentioned above, the headgear 1206 may be configured as a headset that is responsive to voice commands, received on a headset 1210 which may be connected via a network to the portable control unit 1208 and to a remote server, for example, the server 110 as illustrated in FIG. 1.

In an aspect, the portable control unit 1208 may include processing functionality to control the system in response to commands or signals from the user 1204. For example, some of the functionality may include turning the dimensioner device 1201 on or off, such as by pressing a button, or giving a voice command to turn on or turn off. Other functionality may include resetting the dimensioner device 1201 if necessary, or giving commands (such as by pressing a button or giving a voice command) for capturing plurality of image frames of the object 1202. Another function may include initiating a process, such as the method 600 for computing dimensions of the object 1202, in response to various user inputs or commands. Also, other commands to confirm a measurement, redo a measurement, scan a bar code, and other inputs may be entered as needed.

In accordance with some embodiments, after a command is received to start the dimensioning, the user 1204 picks up the object 1202. In this regard, the user 1204 may also turn his or her face toward the object 1202 such that dimensioner device 1201 may properly scan the object 1202 to determine dimensions. In this manner, the user 1204 may quickly and easily make multiple measurements at one time with the measuring devices that are incorporated into the headgear 1206 or the headset 1210 being worn by the user 1204. In other embodiments, the user 1204 may perform the dimensioning by placing the object 1202 at a predefined platform, such as a weigh scale placed on a dimensioning station in a material handling environment. For instance, if the user 1204 is unable to position his or her head or body such that the dimensioner device 1201 may view the entire object 1202 while the user 1204 is holding the object 1202, the user 1204 may need to place the object 1202 far enough away to allow the dimensioner device 1201 to properly scan the object 1202. By way of implementation of illustrated embodiment, the user 1204 does not need to carry packages to designated measuring stations or worry about the location of handheld dimensioners that may tend to get misplaced.

As illustrated, in some embodiments, the dimensioner device 1201 may be optionally mounted on a headset 1210. In this aspect, the headset 1210 may include one or more headphones 1212 and a microphone 1214. In accordance with some embodiments, the headphones 1212 may be used to provide the navigational commands indicative of alerts for initiating re-calibration (as described at step 712 of FIG. 7) of the dimensioner device 1201. The dimensioner device 1201 may further be equipped with voice-recognition software, and the microphone 1214 of the headset 1210 may be used to receive voice commands or other audible input from the user 1204.

In accordance with some embodiments described herein, the processing system 510 of the device 501 may detect an error in computed dimensions of the non-cuboid shaped object (as described at step 614 of FIG. 6). In this regard, the error may represent a mismatch of the computed dimensions of the non-cuboid shaped object when compared to predetermined dimensions of the non-cuboid shaped object. In this aspect, in an example embodiment, where the non-cuboid shaped object is an isosceles triangle faced prism shaped object and where the predetermined dimensions of the prism corresponds to dimensions computed by the object dimensioning system by assuming the non-cuboid shaped object to be an equilateral triangle faced prism shaped object, the processing system 510 may identify an error in the computation of the dimensions of the object and may generate an alert in form of notifications as described in FIG. 11.

In some embodiments, the processing system 510 of the device 501 may also be adapted to determine a new reference surface for which the object dimensioning system is initially calibrated, and detect an expected error in the computed dimensions of the non-cuboid shaped object due to the new reference surface. In this regard, in one example embodiment, the processing system 510 of the device 501 may use a rule, such as, Estimated width of the object($w$)=$w$/cos($t$);

Herein, "w" represents an actual width or a true value of the width of the object (i.e. width of the object known to a dimensioner such as, the device 501) when there is no change in a field of view and reference surface angle realized by the camera unit 548 of the device 510. Further, "t" represents a change in reference surface angle when the field of view of the camera unit 548 of the device 501 is changed, for instance, may be due to mechanical strain or shaking of the device 501. When t=0, there would be no error in the dimensioning of the object by the device 501. When the true width of the object is w and the reference surface angle is wrong by t (i.e., where t does not equal to zero, which indicates error), the estimated width would be w/cos(t).

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A method for computing dimensions of a non-cuboid shaped object, the method comprising:
  capturing, by an image capturing unit of an object dimensioning system, at least one image of a scene associated with a field of view of the object dimensioning system, wherein the non-cuboid shaped object is in the scene;
  determining, from the at least one image, a plurality of three-dimensional (3D) points representing 3D coordinates of various points in the scene;
  identifying, from amongst the plurality of 3D points, a plurality of 3D surface points corresponding to at least one surface of the non-cuboid shaped object that is captured in the at least one image;

identifying one or more planes, wherein each of the one or more planes is defined by a set of neighboring 3D surface points comprising at least three 3D surface points neighboring to each other from amongst the plurality of 3D surface points;

determining a surface plane from amongst the one or more identified planes, wherein the surface plane is coincident with a top surface of the non-cuboid shaped object facing the field of view of the object dimensioning system and contains a maximum of the plurality of 3D surface points;

determining an angular estimation for the surface plane, the angular estimation corresponding to one interior angle of the non-cuboid shaped object, comprising:
  determining a surface normal of the surface plane;
  determining a reference surface normal of a reference surface; and
  calculating the angular estimation based on an angle between the surface normal and the reference surface normal; and computing the dimensions of the non-cuboid shaped object based on the angular estimation and an estimated height of the non-cuboid shaped object.

2. The method of claim 1, wherein determining the plurality of 3D surface points representing 3D coordinates comprises determining a height estimation for each 3D surface point relative to the reference surface, wherein the estimated height of the non-cuboid shaped object is determined based the height estimation of each 3D surface point relative to the reference surface.

3. The method of claim 1, wherein determining the surface plane comprises:
  (a) selecting a consensus set of 3D surface points from amongst the plurality of 3D surface points, wherein the consensus set comprises at least three 3D surface points;
  (b) creating a hypothesis model that corresponds to at least one plane defined by the selected consensus set of 3D surface points;
  (c) computing a distance between the hypothesis model and each 3D surface point other than 3D surface points in the consensus set of 3D surface points;
  (d) adding a first 3D surface point to the selected set of 3D surface points, wherein the computed distance of the first 3D surface point satisfies a predefined tolerance threshold;
  (e) repeating steps (a)-(d) until 3D surface points in the selected set of 3D surface points satisfy a predefined number; and
  (f) storing the hypothesis model as the surface plane.

4. The method of claim 1, further comprising:
calculating a first plurality of angular estimates for the one or more identified planes at a first time point, wherein each of first plurality of angular estimates is indicative of a first angle between a first local normal of one of the one or more identified planes and the reference surface normal of the reference surface at the first time point;
calculating a first distribution of the first plurality of angular estimates;
calculating a second plurality of angular estimates for the one or more identified planes at a second time point, wherein each of second plurality of angular estimates is indicative of a second angle between a second local normal of one of the one or more identified planes and the reference surface normal of the reference surface at the second time point;
calculating a second distribution of the second plurality of angular estimates; and
determining a movement of the object dimensioning system between the first time point and the second time point based on analyzing the first distribution of the first plurality of angular estimates and the second distribution of the second plurality of angular estimates.

5. The method of claim 4, wherein calculating the first distribution of the first plurality of angular estimates comprises calculating one or more first modes of the first distribution, wherein calculating the second distribution of the second plurality of angular estimates comprises calculating one or more second modes of the second distribution, wherein analyzing the first distribution and the second distribution further comprises determining a shift between the one or more first modes and the one or more second modes.

6. The method of claim 5, further comprising initiating a recalibration of the object dimensioning system subsequent to determining the movement of the object dimensioning system.

7. The method of claim 6, wherein the recalibration comprises:
providing an alert to a user indicative of the recalibration of the object dimensioning system; and
capturing, by the image capturing unit, at least one image of a new reference surface, wherein the object dimensioning system is repositioned with respect to the new reference surface, wherein the new reference surface corresponds to one of a ground plane or a platform for placing objects to be dimensioned by the object dimensioning system.

8. The method of claim 1, further comprising detecting an error in the computed dimensions of the non-cuboid shaped object, wherein the error represents a mismatch of the computed dimensions of the non-cuboid shaped object when compared to predetermined dimensions of the non-cuboid shaped object.

9. The method of claim 8, wherein the non-cuboid shaped object is an isosceles triangle faced prism shaped object, wherein the predetermined dimensions are associated with an equilateral triangle faced prism shaped object.

10. The method of claim 1, further comprising:
determining a new reference surface for which the object dimensioning system is initially calibrated; and
detecting an expected error in the computed dimensions of the non-cuboid shaped object due to the new reference surface.

11. An object dimensioning system comprising:
an image capturing unit adapted to capture at least one image of a scene associated with a field of view of the object dimensioning system, wherein a non-cuboid shaped object is in the scene;
a processing unit coupled to the image capturing unit, wherein the processing unit is configured to:
  determine, from the at least one image, a plurality of three-dimensional (3D) points representing 3D coordinates corresponding to multiple points in the scene;
  identify, from amongst the plurality of 3D points, a plurality of 3D surface points corresponding to at least one surface of the non-cuboid shaped object that is captured in the at least one image;
  identify one or more planes, wherein each of the one or more planes is defined by a set of neighboring 3D surface points comprising at least three 3D surface points neighboring to each other from amongst the plurality of 3D surface points;

determine a surface plane from amongst the one or more identified planes, wherein the surface plane is coincident with a top surface of the non-cuboid shaped object facing the field of view of the object dimensioning system and contains a maximum of the plurality of 3D surface points;

determine an angular estimation for the surface plane, the angular estimation corresponding to one interior angle of the non-cuboid shaped object, wherein to determine the angular estimation, the processing unit is further adapted to:

determine a surface normal of the surface plane;

determine a reference surface normal of a reference surface; and calculate the angular estimation based on an angle between the surface normal and the reference surface normal; and compute dimensions of the non-cuboid shaped object based on the angular estimation and an estimated height of the non-cuboid shaped object.

12. The object dimensioning system as claimed in claim 11, wherein to determine the surface plane from amongst the one or more identified planes, the processing unit is further adapted to:

(a) select a consensus set of 3D surface points from amongst the plurality of 3D surface points, wherein the consensus set comprises at least three 3D surface points;

(b) create a hypothesis model that corresponds to at least one plane defined by the selected consensus set of 3D surface points;

(c) compute a distance between the hypothesis model and each 3D surface point other than 3D surface points in the consensus set of 3D surface points;

(d) add a first 3D surface point to the selected set of 3D surface points, wherein the computed distance of the first 3D surface point satisfies a predefined tolerance threshold;

(e) repeat steps (a)-(d) until 3D surface points in the selected set of 3D surface points satisfy a predefined number; and (f) store the hypothesis model as the surface plane.

13. The object dimensioning system as claimed in claim 11, wherein the processing unit is further adapted to:

calculate a first plurality of angular estimates for the one or more identified planes at a first time point, wherein each of first plurality of angular estimates is indicative of a first angle between a first local normal of one of the one or more identified planes and the reference surface normal of the reference surface at the first time point;

calculate a first distribution of the first plurality of angular estimates;

calculate a second plurality of angular estimates for the one or more identified planes at a second time point, wherein each of second plurality of angular estimates is indicative of a second angle between a second local normal of one of the one or more identified planes and the reference surface normal of the reference surface at the second time point;

calculate a second distribution of the second plurality of angular estimates; and determine a movement of the object dimensioning system between the first time point and the second time point based on analyzing the first distribution of the first plurality of angular estimates and the second distribution of the second plurality of angular estimates.

14. The object dimensioning system of claim 13, wherein the processing unit is further adapted to initiate a recalibration of the object dimensioning system based on determining the movement of the object dimensioning system, wherein to recalibrate the object dimensioning system, the processing unit is to further:

provide an alert to a user indicative of the recalibration of the object dimensioning system; and the image capturing unit is to further:

capture at least one image of a new reference surface, wherein the object dimensioning system is repositioned with respect to the new reference surface, wherein the new reference surface corresponds to one of: a ground plane or a platform for placing objects to be dimensioned by the object dimensioning system.

15. The object dimensioning system as claimed in claim 11, wherein the image capturing unit further comprises:

a pattern projecting unit adapted to project a light pattern on the non-cuboid shaped object placed in the field of view of the object dimensioning system; and an image sensor adapted to capture a reflection of the projected light pattern on the non-cuboid shaped object; wherein the processing unit is adapted to determine the plurality of 3D points based on the sensing of the light pattern by the image sensor.

16. The object dimensioning system of claim 11, wherein to determine the plurality of 3D points representing 3D coordinates, the processing unit is further adapted to determine a height estimation for each 3D surface point relative to the reference surface, wherein the estimated height of the non-cuboid shaped object is determined based on the height estimation of each 3D surface points relative to the reference surface.

17. The object dimensioning system of claim 11, wherein the processing unit is further configured to detect an error in the computed dimensions of the non-cuboid shaped object, wherein the error represents a mismatch of the computed dimensions of the non-cuboid shaped object when compared to predetermined dimensions of the non-cuboid shaped object.

18. The object dimensioning system of claim 17, wherein the non-cuboid shaped object is an isosceles triangle faced prism shaped object, wherein the predetermined dimensions are associated with an equilateral triangle faced prism shaped object.

19. An apparatus for computing dimensions of a non-cuboid shaped object, the apparatus comprising at least one processor and at least one non-transitory memory including program code, the at least one non-transitory memory and the program code configured to, with the at least one processor, cause the apparatus to at least:

capture at least one image of a scene associated with a field of view, wherein the non-cuboid shaped object is in the scene;

determine, from the at least one image, a plurality of three-dimensional (3D) points representing 3D coordinates of various points in the scene;

identify, from amongst the plurality of 3D points, a plurality of 3D surface points corresponding to at least one surface of the non-cuboid shaped object that is captured in the at least one image;

identify one or more planes, wherein each of the one or more planes is defined by a set of neighboring 3D surface points comprising at least three 3D surface points neighboring to each other from amongst the plurality of 3D surface points;

determine a surface plane from amongst the one or more identified planes, wherein the surface plane is coincident with a top surface of the non-cuboid shaped object facing the field of view of the object dimensioning system and contains a maximum of the plurality of 3D surface points;

determine an angular estimation for the surface plane, the angular estimation corresponding to one interior angle of the non-cuboid shaped object, wherein the determination of the angular estimation comprises:
   determining a surface normal of the surface plane,
   determining a reference surface normal of a reference surface; and
   calculating the angular estimation based on an angle between the surface normal and the reference surface normal; and compute the dimensions of the non-cuboid shaped object based on the angular estimation and an estimated height of the non-cuboid shaped object.

20. The apparatus of claim 19, wherein the at least one non-transitory memory and the program code is further configured to, with the at least one processor, cause the apparatus to further:

calculate a first plurality of angular estimates for the one or more identified planes at a first time point, wherein each of first plurality of angular estimates is indicative of a first angle between a first local normal of one of the one or more identified planes and the reference surface normal of the reference surface at the first time point;

calculate a first distribution of the first plurality of angular estimates;

calculate a second plurality of angular estimates for the one or more identified planes at a second time point, wherein each of second plurality of angular estimates is indicative of a second angle between a second local normal of one of the one or more identified planes and the reference surface normal of the reference surface at the second time point;

calculate a second distribution of the second plurality of angular estimates; and determine a movement of the apparatus between the first time point and the second time point based on analyzing the first distribution of the first plurality of angular estimates and the second distribution of the second plurality of angular estimates.

\* \* \* \* \*